(12) United States Patent
Bickham et al.

(10) Patent No.: US 9,268,093 B2
(45) Date of Patent: Feb. 23, 2016

(54) SYSTEMS AND METHODS FOR CONVERTING LEGACY MULTIMODE LINKS TO LONGER-WAVELENGTH LINKS

(71) Applicant: CORNING INCORPORATED, Corning, NY (US)

(72) Inventors: Scott Robertson Bickham, Corning, NY (US); Xin Chen, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 42 days.

(21) Appl. No.: 14/283,846

(22) Filed: May 21, 2014

(65) Prior Publication Data

US 2015/0338578 A1 Nov. 26, 2015

(51) Int. Cl.
*G02B 6/26* (2006.01)
*G02B 6/46* (2006.01)

(52) U.S. Cl.
CPC .. *G02B 6/26* (2013.01); *G02B 6/46* (2013.01); *Y10T 29/49004* (2015.01)

(58) Field of Classification Search
CPC ............... G02B 6/4296; G02B 6/0288; G02B 6/12007; G02B 6/29395; G02B 6/43
USPC .......... 385/15, 27, 31, 124, 123; 398/29, 159; 29/592.1
See application file for complete search history.

(56) References Cited

U.S. PATENT DOCUMENTS

| 5,414,548 | A   | * | 5/1995 | Tachikawa ......... | G02B 6/12014 385/14 |
| 6,363,195 | B1  |   | 3/2002 | Abbott, III et al. | |
| 7,680,381 | B1  |   | 3/2010 | Bookbinder et al. | |
| 2014/0086578 | A1 | * | 3/2014 | Bickham ............ | G02B 6/02261 398/29 |

FOREIGN PATENT DOCUMENTS

WO 2012161811 11/2012

OTHER PUBLICATIONS

Cen Xia et al., "Hole-Assisted Few-Mode Multicore Fiber for High-Density Space-Division Multiplexing", IEEE Photonics Technology Letters, Vol. 24, No. 21, Nov. 1, 2012, pp. 1914-1917.
Katsuhiro Takenaga et al., "Large Effective-Area Few-Mode Multicore Fiber", IEEE Photonics Technology Letters, Vol. 24, No. 21, Nov. 1, 2012, pp. 1941-1944.

* cited by examiner

*Primary Examiner* — Ellen Kim
(74) *Attorney, Agent, or Firm* — Robert L. Carlson

(57) ABSTRACT

Systems and methods are disclosed for converting a legacy 850 nm optical-fiber link in a data center to a 1310 nm optical-fiber link. The methods include accessing the primary optical fiber of the legacy 850 nm optical-fiber link and optically connecting thereto one or more sections of compensating optical fiber. The resulting 1310 nm link has a peak wavelength of nominally 1310 nm and supports a bandwidth of greater than 2 GHz·km and a data rate of at least 25 Gb/s.

24 Claims, 16 Drawing Sheets

SYSTEMS AND METHODS FOR CONVERTING LEGACY MULTIMODE LINKS TO LONGER-WAVELENGTH LINKS

FIELD

The present specification relates generally to optical-fiber links ("links") used in data centers and like applications, and in particular relates to systems and methods for converting legacy multimode links to longer wavelength links, e.g., 850 nm links to 1310 nm links.

All references cited herein are incorporated herein by reference in their entirety, including U.S. Pre-Grant Publication No. 2013/0322836 A1, Provisional Patent Application Ser. No. 61/881,169, filed on Sep. 23, 2013, and U.S. Pat. No. 7,995,888.

BACKGROUND

Optical fibers are currently used to transmit optical signals for a variety of applications. Optical fibers, including multimode optical fibers, are frequently used for data transmission (including high-speed data transmission) over distances ranging from one meter or less up to the distance needed to transmit throughout a building, e.g., a data center. The optical-fiber links ("links") in present-day data centers are mostly "legacy links" designed to operate in the 850 nm wavelength window and utilize relatively inexpensive 850 nm VCSEL laser sources.

Unfortunately, optical fiber has relatively high chromatic dispersion in the 850 nm window, which leads to rapid broadening of the optical signals. This high chromatic dispersion is a key limitation on the maximum length of legacy links for high data modulation (data) rates, e.g., 25 Gb/s and higher. In addition, the fiber attenuation is relatively high at 850 nm, and this negatively impacts the performance when the legacy link is more than a few tens of meters.

To operate optical-fiber links at higher data modulation rates, it would be advantageous to convert the 850 nm legacy links to links that have high bandwidth at longer wavelengths, such as 1060 nm or 1310 nm. The 1310 nm window in particular offers a significant performance advantage over the 850 nm window due to its possessing near zero chromatic dispersion as well as relatively low attenuation. This is particularly important at data modulation rates of 25 Gb/s and higher, where dispersive broadening of the optical signals results in large impairments. In addition, high data-rate systems employing silicon-photonic transceivers in the 1310 nm window advantageously require much less electrical power than do conventional transceivers operating at 850 nm.

While in principle it is possible for data-center operators to swap out all the optical-fiber cables optimized for 850 nm VCSELs with new optical-fiber cables optimized for 1310 nm, this approach is costly and labor intensive. Much of the optical-fiber cabling runs beneath floors and other hidden portions of the building in which the data center resides. Further, the existing optical-fiber cabling in just one data center represents thousands of kilometers of optical fiber cabling that would need to be replaced.

SUMMARY

An aspect of the disclosure is a method of converting a first optical-fiber link with that operates at a wavelength $\lambda_1$ to a second optical-fiber link that operates at wavelength $\lambda_2$. The method includes: accessing a primary optical fiber of the first optical-fiber link, the primary optical fiber having a length L1 and a nominal alpha value $\alpha_{40}$; optically connecting at least one section of a compensating optical fiber of a length L2 and an alpha value of $\alpha_{60}$ to the primary multimode optical fiber to form the second optical-fiber link, and wherein the length L2 is in the range $(1/20) \cdot L1 \leq L2 \leq (1/3) \cdot L1$; and wherein L1 is greater than 30 m and less than 300 m and the second optical-fiber link provides an overfilled bandwidth of greater than 2 Ghz·km at $\lambda_2$ and a data rate of at least 25 Gb/s.

Another aspect of the disclosure is a method of reconfiguring an optical-fiber system that has 850 nm transceivers optically coupled by a length L1 of primary optical fiber with a nominal alpha value of $\alpha_{40}$ of about 2.1. The method includes: replacing the 850 nm transceivers with 1310 nm transceivers; adding at least one first section of compensating optical fiber to the primary optical fiber to form a 1310 nm optical-fiber link, wherein the at least one first section of compensating optical fiber define a total length L2 of compensating optical fiber and an alpha value $\alpha_{60}$ in the range $1.5 \leq \alpha_{60} \leq 1.8$, and wherein the length L2 is in the range $(1/20) \cdot L1 \leq L2 \leq (1/3) \cdot L1$; and optically connecting the one or more 1310 nm transceivers with the 1310 nm optical-fiber link, wherein the 1310 nm optical-fiber link supports an overfilled bandwidth of greater than 1.0 Ghz·km at 1310 nm.

Another aspect of the disclosure is a 1310 nm optical-fiber link for a data center: The optical-fiber link includes: first and second transceivers which are configured to transmit and detect light having a wavelength of 1310 nm; a primary optical fiber having a length L1 optically connected to the first and second transceivers having a nominal alpha value $\alpha_{40}$ of about 2.1 and defining a legacy 850 nm optical-fiber link that supports an effective modal bandwidth of greater than 2 Ghz·km at 850 nm; at least one section of compensating optical fiber of length L2 optically connected to the primary multimode optical fiber to define the 1310 nm optical-fiber link, the at least one section of compensating optical fiber having an alpha value $\alpha_{60}$ in the range $1.5 \leq \alpha_{60} \leq 1.8$; wherein the length L2 is in the range $(1/20) \cdot L1 \leq L2 \leq (1/3) \cdot L1$; and wherein the 1310 nm optical-fiber link supports an overfilled bandwidth greater than 1 Ghz·km at 1310 nm.

Another aspect of the disclosure is a 1310 nm optical-fiber system that includes: the optical-fiber link described immediately above; and first and second transceivers optically connected via the 1310 nm optical-fiber link, wherein the first and second transceivers are configured to transmit and detect light having a wavelength of 1310 nm.

Additional features and advantages are to be set forth in the Detailed Description that follows, and in part will be readily apparent to those skilled in the art from that description or recognized by practicing the embodiments as described herein, including the Detailed Description that follows, the claims and the appended drawings.

It is to be understood that both the foregoing general description and the following Detailed Description are merely exemplary and are intended to provide an overview or framework for understanding the nature and character of the claims. The accompanying drawings are included to provide a further understanding and are incorporated into and constitute a part of this specification. The drawings illustrate one or more embodiment(s) and together with the description serve to explain the principles and operation of the various embodiments.

The claims as set forth below are incorporated into and constitute a part of the Detailed Description as set forth below.

DETAILED DESCRIPTION

Figure 1A:
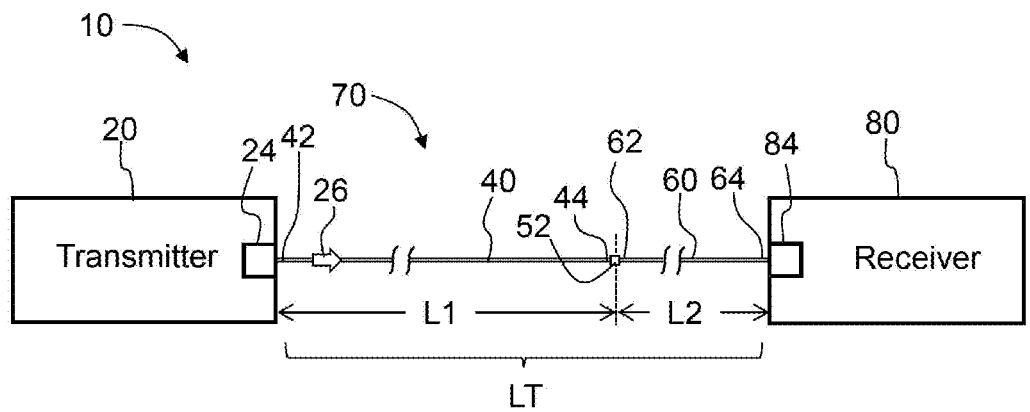
FIGS. 1A and 1B are schematic diagrams of example multimode optical-fiber systems that utilize the optical-fiber link according to the disclosure.

The symbol μm and the word "micron" are used interchangeably herein.

The term "relative refractive index," as used herein, is defined as:

$$\Delta(r)=[n(r)^2-n_{REF}^2)]/2n(r)^2,$$

where n(r) is the refractive index at radius r, unless otherwise specified. The relative refractive index is defined at the operating wavelength of the system, $\lambda_O$, which is typically 850 nm in legacy data centers. In these systems, the wavelength $\lambda_P$ at which the fiber has maximum bandwidth is within about 30 nm of $\lambda_O$ for OM4-type multimode optical fibers and within about 80 nm of $\lambda_O$ for OM3-type multimode optical fibers. In one aspect, the reference index $n_{REF}$ is silica glass. In another aspect, $n_{REF}$ is the maximum refractive index of the cladding. In another aspect, $n_{REF}$ is the average refractive index of the cladding over the range 50 microns≤r≤60 microns. As used herein, the relative refractive index is represented by Δ and its values are given in units of "%," unless otherwise specified. In cases where the refractive index of a region is less than the reference index $n_{REF}$, the relative refractive index is negative and is referred to as having a depressed region or depressed index, and the minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index.

The parameter α (also called the "profile parameter" or "alpha parameter" or "alpha value") as used herein relates to the relative refractive index Δ, which is in units of "%," where r is the radius (radial coordinate), and which is defined by:

$$\Delta(r) = \Delta_0\left[1 - \left(\frac{r-r_m}{r_0-r_m}\right)^\alpha\right],$$

where $r_m$ is the point where Δ(r) is the maximum $\Delta_0$ (also referred to in certain cases below as $\Delta_{1MAX}$), $r_0$ is the point at which Δ(r) % is zero and r is in the range $r_i \le r \le r_f$, where Δ(r) is defined as above, $r_i$ is the initial point of the a-profile, $r_f$ is the final point of the a-profile and a is an exponent that is a real number. For a step-index profile, α>10, and for a gradient-index profile, α<5. It is noted here that different forms for the core radius $r_0$ and maximum relative refractive index $\Delta_0$ can be used without affecting the fundamental definition of Δ. The maximum relative refractive index $\Delta_{1MAX}$ is also called the "core delta," and these terms are used interchangeably herein. For a practical fiber, even when the target profile is an alpha profile, some level of deviation from the ideal situation can occur. Therefore, the alpha value for a practical fiber is the best-fit alpha from the measured index profile. The above expression for $\Delta(r)$ results in alpha values of about 2.12, 2.07 and 2.02 for $\lambda_P$ values of about 850 nm, 1060 nm and 1310 nm, respectively.

The limits on any ranges cited herein are considered to be inclusive and thus to lie within the range, unless otherwise specified.

The NA of an optical fiber means the numerical aperture as measured using the method set forth in IEC-60793-1-43 (TIA SP3-2839-URV2 FOTP-177), titled "Measurement Methods and Test Procedures: Numerical Aperture."

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index $\Delta$.

The term "mode" is short for a guided mode or optical mode. A multimode optical fiber means an optical fiber designed to support the fundamental guided mode and at least one higher-order guided mode over a substantial length of the optical fiber, such as 2 meters or longer. The mode number is denoted m.

The operating wavelength $\lambda_O$ is the wavelength at which the particular system operates, with $\lambda_O$=850 nm being an example of an operating wavelength used in multimode telecommunications systems that utilize VCSELs as the light source and that may be used herein. In systems where coarse wavelength division multiplexing (CWDM) is employed, there may be more than one operating wavelength, for example $\lambda_{O1}$, $\lambda_{O2}$, $\lambda_{O3}$, and $\lambda_{O4}$. The "peak"-wavelength $\lambda_P$ is the wavelength at which a particular optical fiber has the highest bandwidth. The operating wavelength is the wavelength at which the fiber is operating and is not necessarily the peak wavelength. For example a multimode fiber can have a peak wavelength $\lambda_P$=850 nm, but the light traveling therein can have an operating wavelength between 840 nm and 860 nm, for example, 852 nm.

In systems transmitting at a single wavelength, the optimum value of $\lambda_P$ may be equal to the operating wavelength, for example, $\lambda_P=\lambda_O$=850 nm or $\lambda_P=\lambda_O$=1310 nm. In systems transmitting at more than one wavelength, the optimum value of $\lambda_P$ may be located near the center of the range of operating wavelengths, for example $\lambda_{O1}<\lambda_{O2}<\lambda_P<\lambda_{O3}<\lambda_{O4}$, where, for example, 800 nm$<\lambda_P<$900 nm, or 900 nm$<\lambda_P<$1100 nm, or 1200 nm$<\lambda_P<$1400 nm or 1500 nm$<\lambda_P<$1600 nm. The peak wavelengths of primary and compensating optical fibers 40 and 60 are denoted as $\lambda_{P40}$ and $\lambda_{P60}$, respectively, where appropriate.

The overfill (or overfilled) bandwidth (BW) of a multimode optical fiber is defined herein as measured using overfilled launch conditions at 850 nm according to IEC 60793-1-41 (TIA-FOTP-204), Measurement Methods and Test Procedures: Bandwidth. In the discussion below, bandwidth BW is understood to mean overfilled bandwidth, unless otherwise indicated.

The minimum calculated effective modal bandwidth (EBW) can be obtained from measured differential mode delay spectra as specified by IEC 60793-1-49 (TIA/EIA-455-220), Measurement Methods and Test Procedures: Differential Mode Delay.

The units of bandwidth for an optical fiber can be expressed in MHz·km, or GHz·km, etc., and bandwidth expressed in these kinds of units is also referred to in the art as the bandwidth-distance product. The bandwidth is also called modal bandwidth when it is defined in part by modal dispersion. At the system level, the overall bandwidth can be limited by chromatic dispersion in addition to modal bandwidth, which limits the system performance at a high bit rate.

The term "modal dispersion" or "intermodal dispersion" is, in an optical fiber, a measure of the difference in the travel times of the different modes of an optical fiber for light of a single wavelength and is primarily a function of the alpha profile of the optical fiber.

The term "modal delay" is used to denote for laser pulses the time of delay of the different modes usually after propagating unit length due to modal dispersion and refers to the greatest delay between the different modes, unless stated otherwise.

The term "material chromatic dispersion" or "material dispersion" is a measure of how strongly a material causes light of different wavelengths to travel at different speeds within the material, and as used herein is measured in units of ps/(nm·km).

The term "compensation," as used in connection with the compensating multimode optical fiber that has opposite modal delays for compensating the modal dispersion of the primary multimode optical fiber, means either partial or complete compensation, i.e., a reduction or elimination of the adverse effects of the modal dispersion on performance such as bandwidth.

Multimode Optical-Fiber System

FIG. 1A is a schematic diagram of an example multimode optical-fiber system ("system") 10 that includes an optical transmitter 20, first and second concatenated multimode optical fibers 40 and 60 that define an optical-fiber link ("link") 70 of length LT, and a receiver 80. The optical transmitter 20 has a light source 24. As a VCSEL is used herein as the exemplary light source 24, the VCSEL is also referred to herein as VCSEL 24.

The system is designed to operate at an operating wavelength longer than 850 nm, i.e. $\lambda_O>$850 nm. In one example, light source 24 is a VCSEL operating at $\lambda_O$ around 900 nm, 980 nm, 1060 nm, 1310 nm or 1550 nm. In another example, light source 24 is a silicon-photonics laser that generates an output light 26 at a single wavelength, $\lambda_O$ around 1310 nm. In another example, light source 24 is a silicon-photonics laser that generates output light 26 at a single wavelength, $\lambda_O$ around 1550 nm. In another example, light source 24 can generate output light 26 at first and second wavelengths. The optical transmitter 20 is configured to drive light source 24 so that light 26 carries information as optical signals.

In another example, light source 24 is an array of N VCSEL or silicon-photonics lasers operating at wavelengths, $\lambda_{O1}$, $\lambda_{O2}$, ..., $\lambda_{ON}$, where N≥2 and each of the N lasers is coupled into one of N multimode optical fibers 40. In another example, the operating wavelengths of the N lasers may be approximately equal, for example within ±10 nm of a central wavelength $\lambda_O$, where, for example, $\lambda_O$ is 1060 nm or 1310 nm. The N multimode optical fibers 40 may be cabled in the form of N individual fibers or in the form of a ribbon cable with N strands.

In another example, light source 24 is an array of two or more silicon-photonics lasers operating at different wavelengths, $\lambda_{O1}$, $\lambda_{O2}$, ..., $\lambda_{ON}$, where N≥2, wherein the N lasers is multiplexed into a single output light 26. In another example, the operating wavelengths of the N lasers may be spaced by $\Delta\lambda_O$, where $\Delta\lambda_O$ is approximately constant. In another example, N=4 and $\Delta\lambda_O$ is approximately 20 nm, and $\lambda_{O1}$=1270 nm, $\lambda_{O2}$=1290 nm, $\lambda_{O3}$=1310 nm and $\lambda_{O4}$=1330 nm. In another example, N=8 and $\Delta\lambda_O$ is approximately 10 nm, and $\lambda_{O1}$=1270 nm, $\lambda_{O2}$=1280 nm, $\lambda_{O3}$=1290 nm, $\lambda_{O4}$=1300 nm, $\lambda_{O5}$=1310 nm, $\lambda_{O6}$=1320 nm, $\lambda_{O7}$=1330 nm and $\lambda_{O8}$=1340 nm.

Figure 1B:
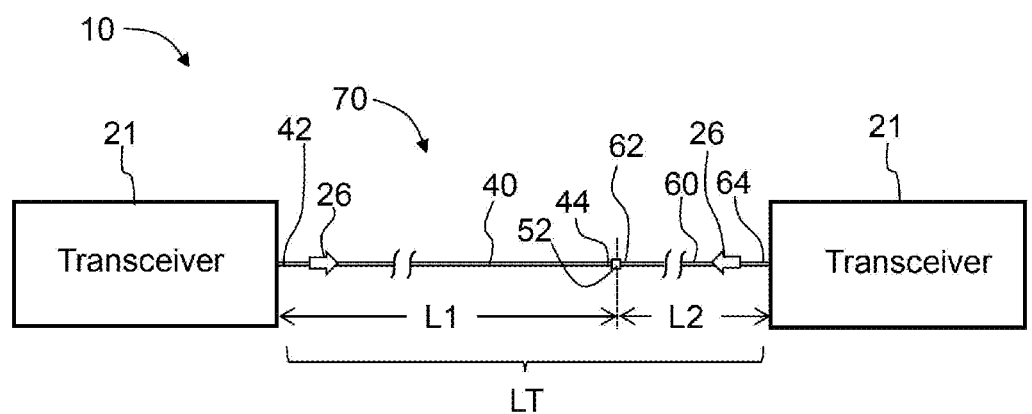

FIG. 1B is similar to FIG. 1A and illustrates an example system 10 wherein transmitter 20 and receiver 80 are combined to form transceivers 21 that are optically connected by optical-fiber link 70. The transceivers 21 can both transmit and receive optical signals 26. In an example, transceivers 21 can transmit and receive optical signals 26 having different wavelengths.

The first multimode optical fiber 40 has first and second ends 42 and 44 that define a length L1, with the first end being optically coupled to light source 24. The first multimode optical fiber 40 is a standard type of multimode optical fiber having a peak wavelength of $\lambda_{P40}$ that can be, for example, 850 nm. The first multimode optical fiber 40 is "standard" in the sense that it has an alpha profile (i.e., a value for α) that generally minimizes the intermodal dispersion at the peak wavelength of $\lambda_{P40}$.

The first multimode optical fiber 40 is designed to transmit optical signals 26 at the operating wavelength $\lambda_O$ of 850 nm. At this wavelength, multimode opticalfiber 40 has high chromatic dispersion, which limits the maximum transmission length for high data rates, e.g., 25 GHz and higher. To operate optical-fiber links 70 at higher data modulation rates, it would be advantageous to use longer operating wavelengths that have lower chromatic dispersion, such as 980 nm, 1060 nm, 1310 nm or 1550 nm. However, multimode optical fiber 40 has lower bandwidth at longer operating wavelengths due to modal dispersion. The present invention solves this modal dispersion problem by concatenating a modal dispersion compensating fiber, i.e., second multimode optical fiber 60, to first multimode optical fiber 40.

In an example, first multimode optical fiber 40 carries more than about 20 LP modes and has an operating wavelength $\lambda_O$ of 850 nm, 980 nm, 1060 nm, 1310 nm or 1550 nm. The first multimode optical fiber 40 is the primary optical fiber in system 10 and so is referred to hereinafter as "primary fiber 40." Likewise, second multimode optical fiber 60 is a compensating optical fiber designed to compensate for modal dispersion arising in primary fiber 40 and so is referred to hereinafter as "compensating fiber 60."

In practice, the order of the primary and compensating fibers 40, 60 can be switched so that the compensating fiber is directly connected to transmitter 20 and the primary fiber is directly connected to receiver 80. The compensating fiber 60 may also be deployed as one or more jumper cables, which may be disposed between optical transmitter 20 and primary fiber 40 and/or between the primary fiber and optical receiver 80. In an example, the one or more jumper cables are selected from a collection of jumper cables having different lengths. Having such a collection of jumper cables facilitates the rapid installation of a suitable length of compensating fiber 60.

In an example embodiment, primary fiber 40 is optimized to transmit an optical signal 26 over distances from about tens of meters to several hundred meters with low modal delay at a wavelength of 850 nm. The primary fiber 40 can be used in system 10 to distribute an optical signal 26 throughout a building or a limited area, in accord with current practices for multimode optical fibers. The primary fiber 40 may also be intended for high data-rate transmission, such as transmission speeds of greater than 10 Gb/s, greater than 20 Gb/s, greater than 25 Gb/s or greater than 40 Gb/s.

Examples of primary fiber 40 include an OM3-type multimode fiber that has a nominal effective modal bandwidth $EMBW_{40}$=2.0 GHz·km or better (higher) at 850 nm and an overfilled bandwidth $BW_{40}$=1.5 GHz·km or better at 850 nm or an OM4-type multimode fiber that has a nominal effective modal bandwidth $EMBW_{40}$=4.7 GHz·km or better at 850 nm and an overfilled bandwidth $BW_{40}$=3.5 GHz·km or better at 850 nm. In another example, primary fiber 40 has a nominal effective modal bandwidth $EMBW_{40}$=2 GHz·km or better over a first wavelength range from 840 nm to 860 nm.

The compensating fiber 60 has first and second ends 62 and 64 that define a length L2, with the first end being optically coupled to second end 44 of primary fiber 40 at a coupling location 52 to define optical-fiber link 70. The particular configuration and properties of compensating fiber 60 are described in greater detail below. The second end 64 of compensating fiber 60 is optically coupled to receiver 80, which includes a detector 84 such as a photodiode.

Figure 2A:
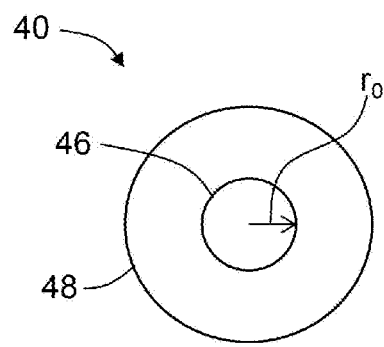
FIGS. 2A and 2B are example cross-sectional views of the primary and compensating multimode optical fibers of the systems of FIGS. 1A and 1B.
Figure 2B:
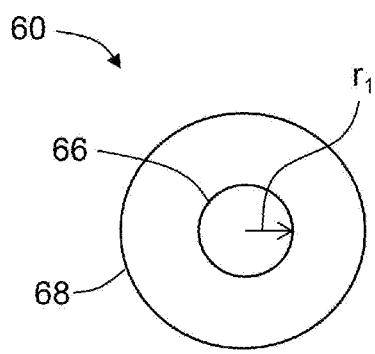

FIGS. 2A and 2B are respective cross-sectional views of primary and compensating fibers 40 and 60. The primary fiber 40 has a core 46 with a radius $r_0$ and a surrounding cladding 48. The compensating fiber 60 has a core 66 with a radius $r_1$ and a surrounding cladding 68. In an example, radius $r_0$ is equal to or substantially equal to radius $r_1$ for the purpose of optimizing the optical coupling between fibers 40 and 60 at coupling location 52. In an example, coupling location 52 is defined by a splice between the two optical fibers 40 and 60, or by an optical-fiber connector. At least one of primary fiber 40 and compensating fiber 60 can have a low index trench in the cladding (48, 68) for the purpose of improving fiber-bending performance and modal bandwidth.

Figure 2C:
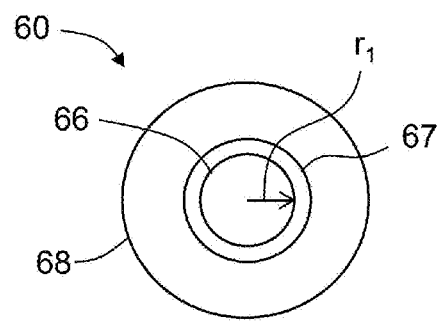
FIG. 2C is similar to FIG. 2B and illustrates an example embodiment of a bend-insensitive compensating fiber.

FIG. 2C is similar to FIG. 2B and illustrates an example embodiment of a bend-insensitive compensating fiber 60. In an example, the bend insensitive property of compensating fiber 60 is provided by the addition of a trench 67 (i.e., a low-index ring) adjacent core 66. The trench 67 needs not be immediately adjacent core 66. Examples of such a bend-insensitive fiber are disclosed in U.S. Pat. No. 7,680,381. It will be understood that the term "bend-insensitive" and like terms actually mean "substantially bend insensitive."

To at least partially compensate for the time delay caused by modal dispersion in primary fiber 40 at the operating wavelength $\lambda_O$, compensating fiber 60 is configured to provide an opposite modal delay, i.e., an opposite time delay for the various guided modes. In other words, the maximum compensating modal delay of compensating fiber 60 has the opposite sign to that of the modal dispersion of primary fiber 40 at the operating wavelength $\lambda_O$, and has a magnitude sufficient to at least partially (and in an example, completely) cancel the delay due to modal dispersion of the primary fiber. This is used to reduce or eliminate the overall time delay in the concatenated primary and secondary fibers 40 and 60 of system 10.

To achieve this compensating effect, compensating fiber 60 is provided with a modal delay by detuning its alpha value relative to the optimum value for 850 nm. In particular, the alpha value $\alpha_{60}$ of compensating fiber 60 is detuned from its otherwise optimum value at the peak wavelength $\lambda_{P40}$ for primary fiber 40, i.e., $\alpha_{40} > \alpha_{do}$, so that the compensating fiber has a relatively high modal delay.

Figure 3:
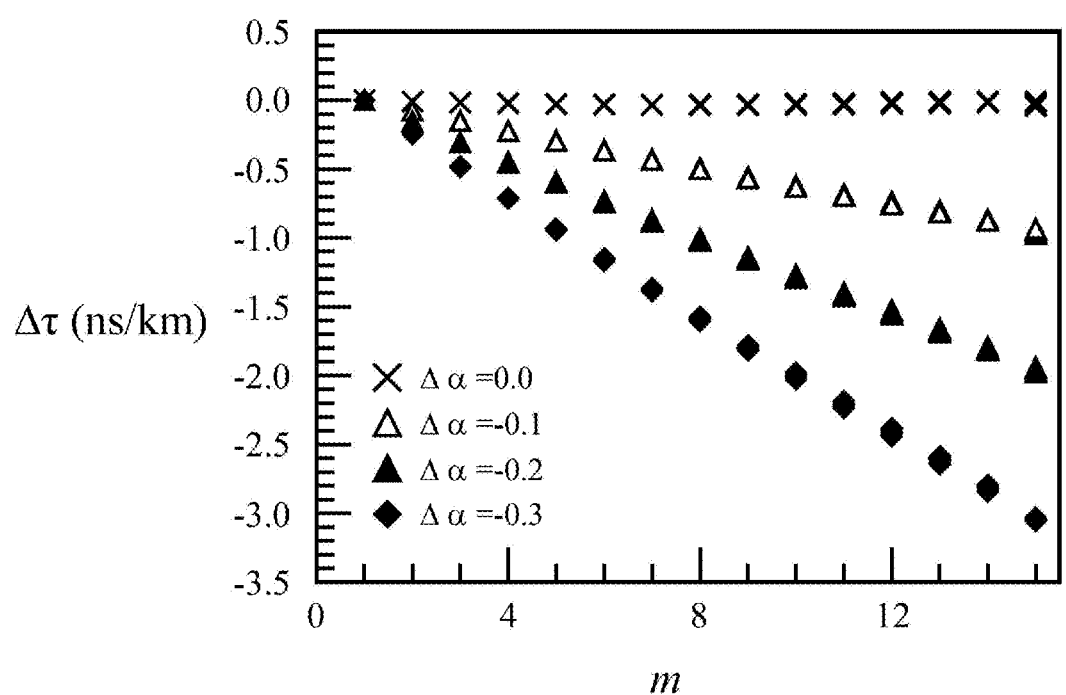
FIG. 3 is a plot of mode group number m versus relative delay Δτ (ns/km) for an example optical fiber having four different values of alpha detuning values Δα, namely Δα=0, Δα=−0.1, Δα=−0.2 and Δα=−0.3.
Figure 8:
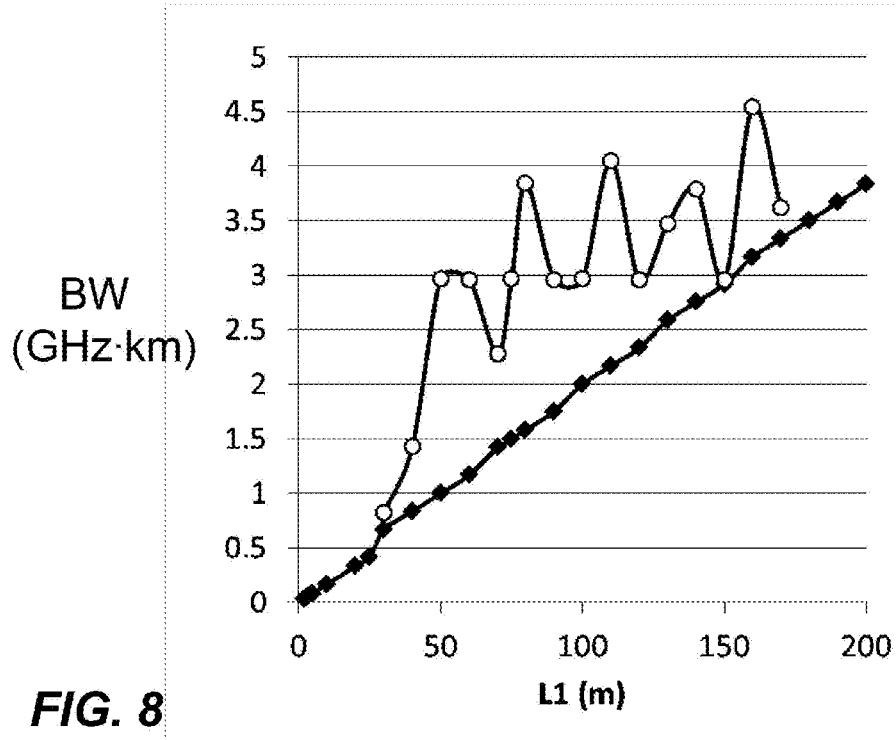
FIG. 8 is a plot of the overfilled bandwidth at 1310 nm of the link as a function of the length L1 of the primary fiber in accordance with Example 3.

FIG. 3 (which is the same as FIG. 8 of U.S. Pub. No. 2014/0086578) is a plot of mode group number m versus relative delay Δτ (ns/km) for an example fiber having four different alpha detuning values Δα, namely, Δα=0, Δα=−0.1, Δα=−0.2 and Δα=−0.3. One example of compensating fiber 60 has graded index core with a maximum relative refractive index $\Delta_{1MAX}$=1%, and the core radius $r_1$=$r_0$=25 μm, so that the NA and core size match those of a standard 50-μm, multimode primary fiber 40. In an example, compensating fiber 60 has a graded index core with a maximum relative refractive index $\Delta_{1MAX}$ in the range 0.5% to 2.5%.

In system 10, the modal delay imparted to compensating fiber 60 by its detuned alpha value $\alpha_{60}$ compensates at least in part for the modal delays generated in primary fiber 40 from modal dispersion. Consequently, compensating fiber 60 has a relatively small bandwidth at $\lambda_{P40}$ as compared to primary fiber 40 having a peak wavelength $\lambda_{P40}$. The compensating fiber 60 also has low bandwidth at the operating wavelength $\lambda_O > \lambda_{P40}$ and would not be suitable for use as primary (a transmission) optical fiber 40 in system 10. An example overfilled bandwidth $BW_{60}$ at $\lambda_{P40}$ for compensating fiber 60 is $BW_{60} \leq 500$ MHz·km, while in another example $BW_{60} \leq 300$ MHz·km, and in another example $BW_{60} \leq 100$ MHz·km.

Another way of appreciating how much smaller the overfilled bandwidth $BW_{60}$ for compensating fiber 60 is compared to the overfilled bandwidth $BW_{40}$ of primary fiber 40 is to consider the ratio $R_{BW}$ of these bandwidths at $\lambda_{P40}$. In example embodiments, the ratio $R_{BW} = BW_{40}/BW_{60}$ is $R_{BW} > 3$, or $R_{BW} > 5$ or $R_{BW} > 10$.

A benefit of compensating fiber 60 having such a small bandwidth is that only a relatively small length L2 of the compensating fiber is needed to provide the requisite modal dispersion for the entire system 10. The delays at each radial position in primary fiber 40 and in compensating fiber 60 are additive so that with the use of the compensating fiber, the overall delay for system 10 can be controlled as a function of radial position.

Also in an example embodiment, compensating fiber 60 is designed to have a peak wavelength $\lambda_{P60}$ that differs from the peak wavelength $\lambda_{P40}$ of primary fiber 40. This is analogous to detuning the alpha parameter $\alpha_{60}$ of compensating fiber 60. In an example embodiment, $\lambda_{P60} - \lambda_{P40} \geq 400$ nm.

In another example embodiment, compensating fiber 60 has a high overfilled bandwidth $BW_{60}$ at $\lambda_{P60}$. Thus, in example embodiments, $BW_{60} \geq 2$ GHz·km, or $BW_{60} \geq 4$ GHz·km, or $BW_{60} \geq 5$ GHz·km or $BW_{60} \geq 7$ GHz·km at a wavelength greater than 880 nm. This allows for optical-fiber link 70 to have a relatively high link bandwidth $BW_L$ over a range of wavelengths between $\lambda_{P40}$ and $\lambda_{P60}$ so that respective optical signals 26 within these respective wavelength ranges can be transmitted over the link at relatively high data rates. In an example, fiber link 70 has a link bandwidth $BW_L$ greater than 500 MHz·km and can transmit optical signals of 25 Gb/s or greater over the link length LT=L1+L2 for first and second optical signals 26 with respective wavelengths in the first and second wavelength ranges. In an example, the link length LT is in the range 30 m to 500 m and the link bandwidth $BW_L$ is greater than 500 MHz·km in the range from 1030 nm to 1090 nm. In another example, the link length LT is in the range 30 m to 500 m and the link bandwidth $BW_L$ is greater than 500 MHz·km in the range from 1270 nm to 1330 nm.

In another example, optical-fiber link 70 has a link bandwidth $BW_L$ greater than 1000 MHz·km and can transmit optical signals of 25 Gb/s or greater over the link length LT=L1+L2 for first and second optical signals 26 with respective wavelengths in the first and second wavelength ranges. In an example, the link length LT is in the range from 30 m to 500 m and the link bandwidth $BW_L$ is greater than 1000 MHz·km in the wavelength range from 1030 nm to 1090 nm. In another example, the link length LT is in the range 30 m to 500 m and the link bandwidth $BW_L$ is greater than 1000 MHz·km in the wavelength range from 1270 nm to 1330 nm.

In general, the greater the magnitude of $\Delta\alpha$, the smaller the length L2 of compensating fiber 60 required to compensate for the chromatic dispersion effect in primary fiber 40. To this end, in one embodiment, an example compensating fiber 60 has a value for $\Delta\alpha$ in the range $-0.1 \leq \Delta\alpha \leq -0.9$. In another embodiment, an example compensating fiber 60 has a value for $\Delta\alpha$ in the range $0.3 \leq \Delta\alpha \leq 0.7$. In another embodiment, an example compensating fiber 60 has a value for $\Delta\alpha$ in the range $-0.3 \geq \Delta\alpha \geq -0.7$. These constraints on $\Delta\alpha$ ensure that the NA of compensating fiber 60 is compatible with that of legacy primary fiber 40, which has a nominal NA of about 0.2 and a core diameter of 50 μm.

In examples where $\Delta\alpha$ is large (e.g., $\Delta\alpha \leq -0.2$), the length L2 of compensating fiber 60 may be quite short, e.g., $L2 \leq 40$ m, or $L2 \leq 20$ m, or $L2 \leq 10$ m or $L2 \leq 5$ m. When compensating fiber 60 can be used in system 10 to compensate for modal dispersion effects, the overall system or link bandwidth $BW_L$ can be made greater than either the bandwidth $BW_{40}$ of primary fiber 40 or the bandwidth $BW_{60}$ of compensating fiber 60 alone.

For primary fibers 40 with different peak wavelengths $\lambda_{P40}$ around the 850 nm window, one can achieve optimum system performance by choosing different lengths L2 of compensating fiber 60. In example embodiments, the length ratio of L1 of primary fiber 40 to L2 of compensating fiber 60 is 2:1, or 3:1, or 5:1, or 10:1, or 20:1 or even 50:1. In an example embodiment, L1/L2 is in the range $2 \leq L1/L2 \leq 50$.

The system 10 described herein is well suited to transmitting data at high rates, such as rates faster than or equal to 25 Gb/s or greater than 40 Gb/s. In an example embodiment, system 10 can have multiple compensating fibers 60 that operate in parallel, one or more primary fibers 40 being concatenated with each compensating fiber. The compensating fiber 60 may also comprise a portion of a ribbon cable or other group of cables including 4, 12, 24, etc. compensating fibers for parallel optics configurations.

In an example, the length L2 of compensating fiber 60 is $L2 \leq 40$ m, $L2 \leq 20$ m, $L2 \leq 10$ m or $L2 \leq 5$ m. In an example, the length L1 of primary fiber 40 is $L1 \geq 30$ m, or $L1 \geq 70$ m or even $L1 \geq 100$ m. In an example embodiment, the combination of primary fiber 40 and one or more compensating fibers 60 concatenated thereto defines a link bandwidth $BW_L$, wherein in one example $BW_L > 1000$ MHz-km, and in another example $BW_L > 2000$ MHz-km, and in another example $BW_L > 3000$ MHz-km and in another example $BW_L > 4000$ MHz-km.

In an example embodiment, compensating fiber 60 can be a bend insensitive fiber, as described above in connection with FIG. 2C. As discussed above, an example bend-insensitive compensating fiber 60 has trench 67 adjacent core 66. However, in this example embodiment, trench 67 also allows the highest modes of the higher-order modes to propagate over substantial distances, whereas before these highest modes were lossy and so did not substantially contribute to the mode delay.

Thus, in an example embodiment of bend-insensitive compensating fiber 60, the parameters defining trench 67 are selected to minimize the adverse effects of the propagation of the highest modes while also providing the desired bend insensitivity.

Figure 4:
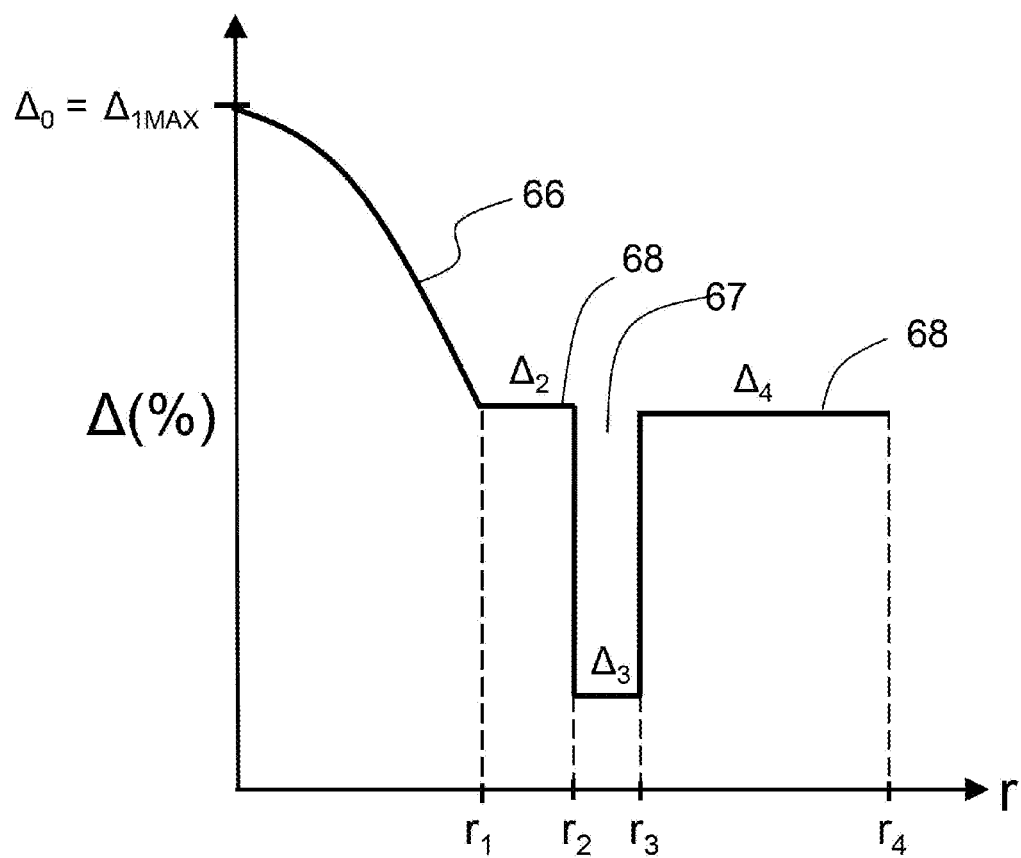
FIG. 4 is a plot of relative refractive index profile Δ(%) versus radius r for an example bend-insensitive compensating fiber.

FIG. 4 is a plot of the relative refractive index profile $\Delta$ (%) versus the radius of an example bend-insensitive compensating fiber 60 and shows the various design parameters (namely, relative refractive index values $\Delta_{1MAX}$, $\Delta_2$, $\Delta_3$, $\Delta_4$ and radii $r_1$ through $r_4$). The radii $r_1$ through $r_4$ are in microns and the relative refractive index values are in "$\Delta$ (%)." The trench 67 is shown by way of example as being spaced apart from core 66 by a distance $(r_2 - r_1)$ and thus can be considered as residing in cladding 68. Strictly speaking, in this geometry, cladding 68 comprises an inner and outer cladding corresponding to the relative refractive indices $\Delta_2$ and $\Delta_4$. Also, $\Delta_{1MAX} = \Delta_O$.

In an example, $\Delta_{1MAX}$ is greater than about 0.5% and less than about 2.5%, e.g., $0.5\% \leq \Delta_{1MAX} \leq 2.0\%$, $0.7\% \leq \Delta_{1MAX} \leq 1.5\%$, $0.8\% \leq \Delta_{1MAX} \leq 1.3\%$ or $0.9\% \leq \Delta_{1MAX} \leq 1.2\%$. In an example, the core radius $r_1$ is greater than about 20 μm and less than about 40 μm, e.g., 20 μm $\leq r_1 \leq 30$ μm, 28 μm $\leq r_1 \leq 34$ μm or 22 μm $\leq r_1 \leq 28$ μm. In an example, the core alpha $\alpha_{60}$ is greater than about 1.1 and less than about 2.0, e.g., $1.3 \leq \alpha_{60} \leq 1.9$, $1.4 \leq \alpha_{60} \leq 1.8$ or $1.5 \leq \alpha_{60} \leq 1.7$.

As previously noted, compensating fiber 60 may be a bend-insensitive multimode fiber with a refractive index profile comprising a trench as illustrated in FIG. 4. In an example, $\Delta_3$ is less than −0.1%, e.g., $-0.7\% \leq \Delta_3 \leq -0.1\%$, $-0.6\% \leq \Delta_3 \leq -0.2\%$, $-0.5\% \leq \Delta_3 \leq -0.3\%$ or $-0.45\% \leq \Delta_3 \leq -0.35\%$. In an example, $(r_3-r_2)$ is less than 10 μm and greater than 1 μm, e.g., 8.0 $\mu m \leq (r_3-r_2) \leq 2.0$ μm or 7.0 $\mu m \leq (r_3-r_2) \leq 3.0$ μm. In an example, trench 67 is spaced apart from graded index core 66 by a radial distance $(r_2-r_1)$ that is greater than 0.5 μm and less than 3 μm, e.g., $2.0 \mu m \leq (r_2-r_1) \leq 0.5$ μm or $2.0 \mu m \leq (r_2-r_1) \leq 1.0$ μm. In an example, $\Delta_2$ has a magnitude that is less than 0.1%, e.g., $-0.075\% \leq \Delta_2 \leq 0.075\%$, $-0.05\% \leq \Delta_2 \leq 0.05\%$, $-0.1\% \leq \Delta_2 \leq 0.0\%$ or $0.0\% \leq \Delta_2 \leq 0.1\%$.

Figure 5:
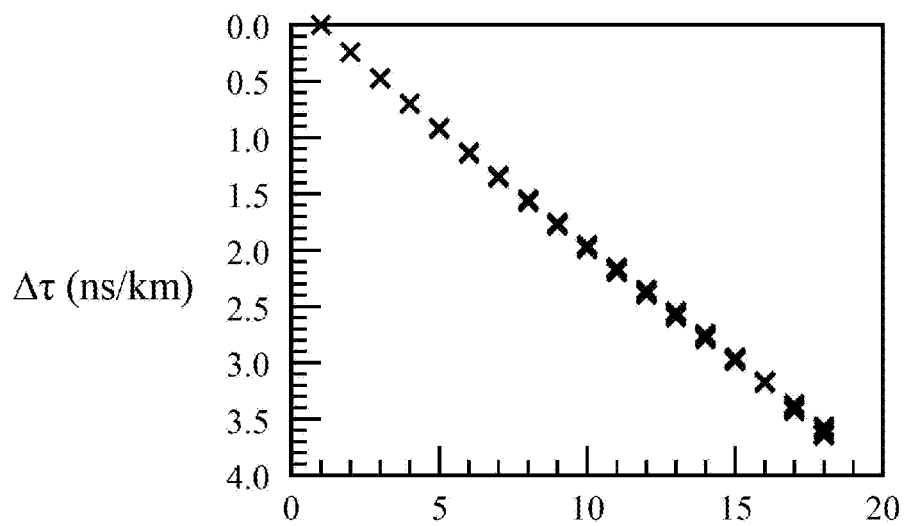
FIG. 5 is a plot of mode group number versus relative delay (ns/km) for the compensating fiber set forth in Table 1 (below) for an operating wavelength of 850 nm.
Figure 10:
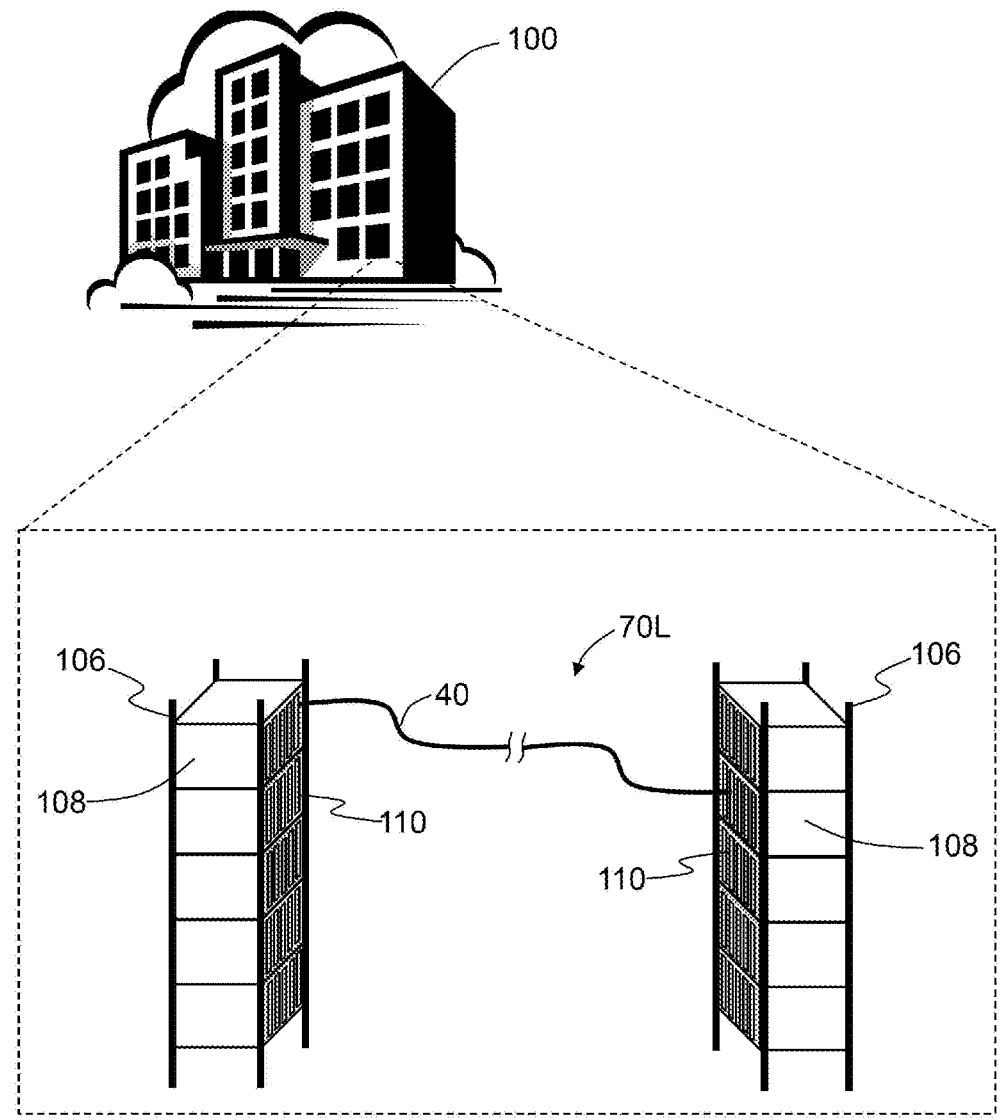
FIG. 10 shows an example data center and includes a close-up view of two racks within a data center that are optically connected by a 850 nm legacy link.

FIG. 5 (which is the same as FIG. 10 of U.S. Pub. No. 2014/0086578) is a plot of the mode group number m versus the relative delay Δτ (ns/km) for an example compensating fiber 60 at an operating wavelength of 850 nm. The plot of FIG. 5 shows all mode groups for compensating fiber 60. Because the highest modes of the higher-order modes can propagate over the entire length of system 10, the maximum relative delay is slightly higher for a bend-insensitive compensating fiber 60 than for the more conventional form of the compensating fiber.

The spread of the highest modes (i.e., the higher-order modes having the highest mode group numbers m) is not substantial, and the relationship between the relative delay and the mode group number is smooth. This characteristic is also maintained at an operating wavelength of 1060 nm so that the same bend-insensitive compensating fiber 60 can be used for a range of operating wavelengths, including at least those in the range from 850 nm to 1060 nm.

Figure 6:
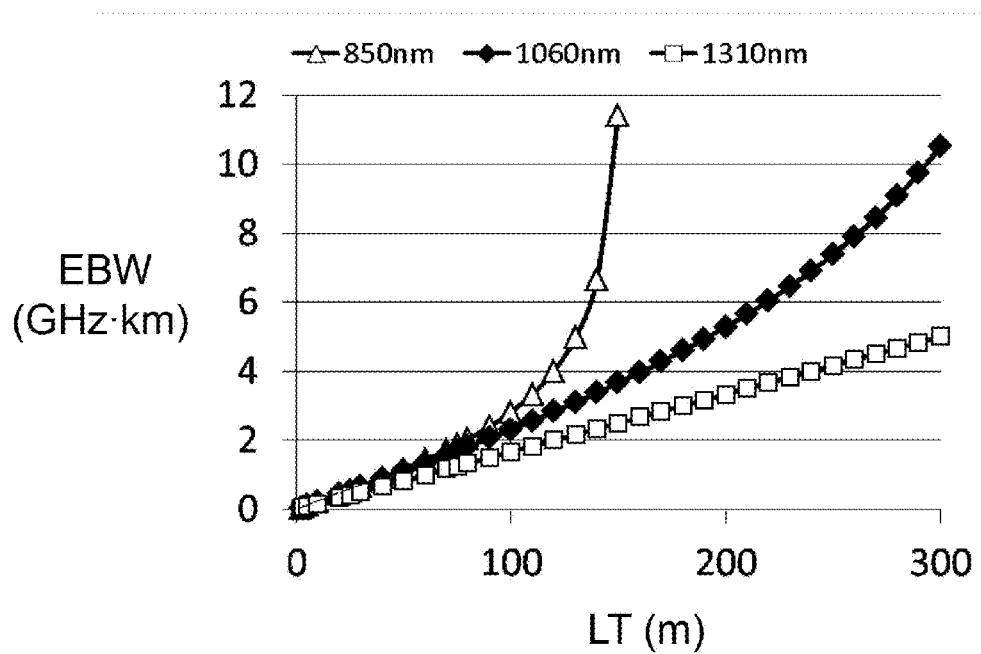
FIG. 6 is a plot of the effective modal bandwidth EBW (GHz-km) versus the maximum reach LT of the compensating link at operating wavelengths λ of 850 nm, 1060 nm and 1310 nm.

FIG. 6 illustrates the maximum reach of length LT at a 25 Gb/s data rate of an example compensating link 70 versus the effective modal bandwidth EBW (GHz-km) for operating wavelengths $\lambda_O$ 1060 nm and 1310 nm as compared with an uncompensated multimode link at the operating wavelength of 850 nm. The reach for uncompensated link 70 at 850 nm is limited to about 125 m due to a broadening of chromatic dispersion, but this is alleviated by the operating wavelength being shifted to longer values with compensated links. At an operating wavelength $\lambda_O$ of 1060 nm, length LT has a maximum reach of greater than 150 m, greater than 200 m or even greater than 250 m. At an operating wavelength $\lambda_O$=1310 nm, the maximum reach is greater than 200 m, greater than 300 m or even greater than 400 m.

Figure 7A:
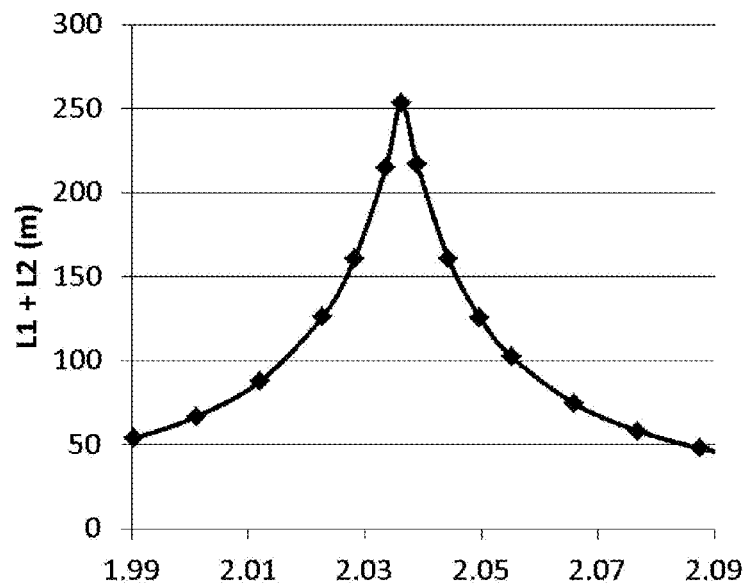
FIG. 7A is a plot of the maximum reach LT of the compensating link versus the average alpha $\alpha_{AVG}$ of the link, wherein $\alpha_{AVG}=(\alpha_{40}L1+\alpha_{60}L2)/(L1+L2)$, and wherein $\alpha_{60}=1.58$ and the operating wavelength of the system is shifted from $\lambda_O=850$ nm to $\lambda_O=1310$ nm.

FIG. 7A illustrates the maximum reach of length LT at a 25 Gb/s data rate versus the average alpha $\alpha_{AVG}$ of link 70, defined to be $\alpha_{AVG}=(\alpha_{40} L1+\alpha_{60} L2)/(L1+L2)$. In this example, $\alpha_{60}$=1.58 and the operating wavelength of system 10 is shifted from 850 nm to 1310 nm. Also in this example, $\alpha_{40}$=2.12, which is the nominal alpha value for OM4-type and OM3-type multimode fibers (40, 60), which are optimized for an operating wavelength of about 850 nm and have EMBW$_{40}$ values greater than 4.7 GHz-km and 2.0 GHz-km, respectively. As shown by FIG. 7A, LT=L1+L2>50 m for $1.99 \leq \alpha_{AVG}<2.09$, LT>100 m for $2.02 \leq \alpha_{AVG}<2.06$ and LT>150 m for $2.03 \leq \alpha_{AVG}<2.07$.

Figure 7B:
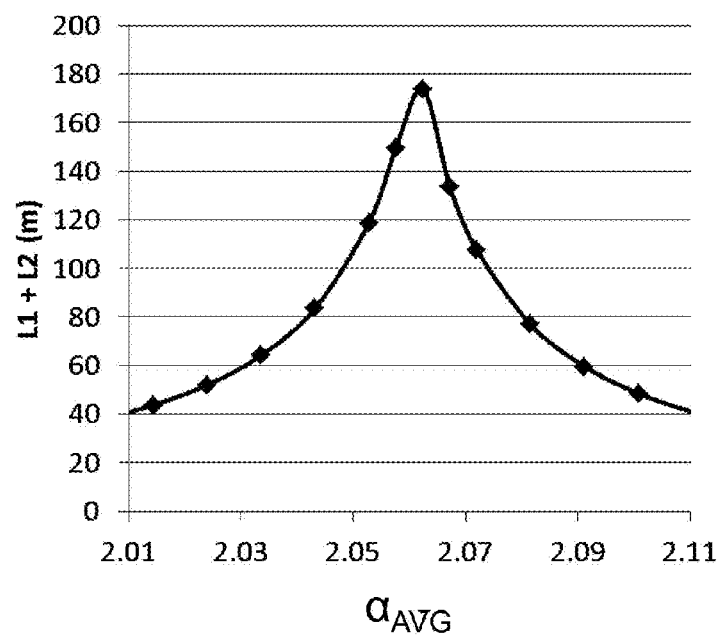
FIG. 7B is similar to FIG. 7A, wherein $\alpha_{60}=1.7$ and the operating wavelength of the system is shifted from $\lambda_O=850$ nm to $\lambda_O=1060$ nm.

FIG. 7B is similar to FIG. 7A but for an alpha value $\alpha_{60}$=1.7 and wherein the operating wavelength $\lambda_O$ of compensating link 70 is shifted from 850 nm to 1060 nm. As in the previous example, $\alpha_{40}$=2.12, which is the nominal alpha value for OM4-type and OM3-type multimode fibers (40,60), which are optimized for an operating wavelength of $\lambda_O$ of about 850 nm and have EMBW$_{40}$ values greater than 4.7 GHz-km and 2.0 GHz-km, respectively. As shown by FIG. 7B, LT=L1+L2>40 m for $2.01 \leq \alpha_{AVG}<2.11$, LT>70 m for $2.04 \leq \alpha_{AVG}<2.09$ and LT>100 m for $2.05 \leq \alpha_{AVG}<2.075$.

Figure 7C:
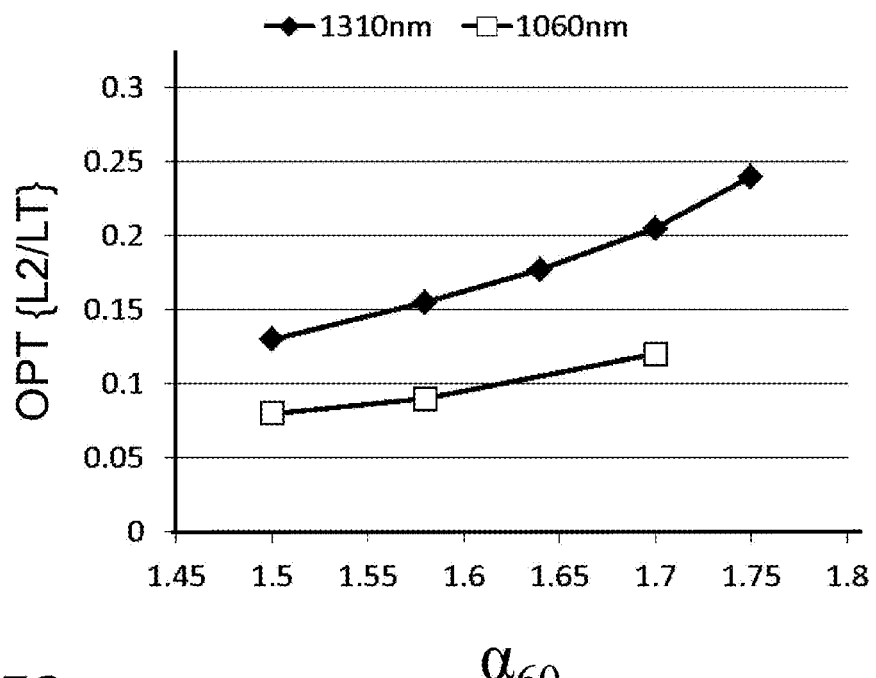
FIG. 7C illustrates the optimum value of the compensation ratio L2/LT (denoted OPT {L2/LT}) as a function of the alpha value $\alpha_{60}$ of the compensating jumper for compensating links in which the operating wavelength has been shifted to 1310 nm (solid diamonds) or 1060 nm (open squares)

FIG. 7C is a plot of the optimum value of the compensation ratio L2/(L1+L2)=L2/LT (denoted as OPT {L1/L2}) as a function of the alpha value $\alpha_{60}$ for compensating fiber 60 for link 70 in which the operating wavelength $\lambda_O$ has been shifted from 850 nm to 1310 nm (solid diamonds) or 1060 nm (open squares). In examples, $\alpha_{60}$ is in the following ranges: $1.5 \leq \alpha_{60} \leq 1.9$, for conversion of the operating wavelength from 850 nm to 1310 nm, or $1.5 \leq \alpha_{60} \leq 1.7$, for conversion of the operating wavelength from 850 nm to 1060 nm.

FIG. 7C is based on a known design of compensating fiber 60, although the refractive index profile is not always known a priori. On the other hand, measurement of the differential delay at the operating wavelength $\lambda_O$ can be used to determine the optimum compensation ratio L2/(L1+L2)=L2/LT as a function of the differential mode delay (DMD) spread in compensating fiber 60.

Figure 7D:
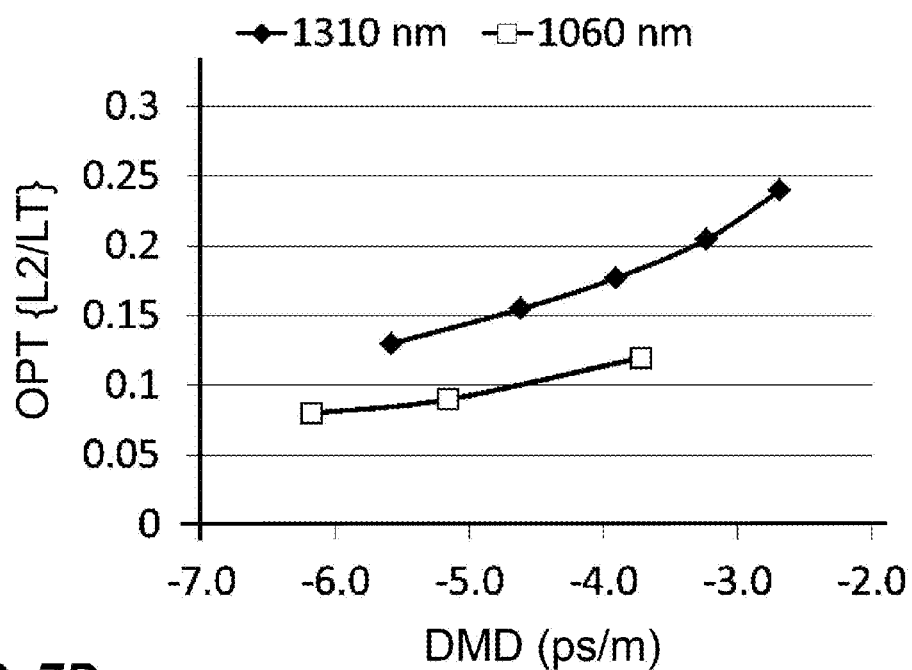
FIG. 7D is similar to FIG. 7C but illustrates the optimum value of the compensation ratio L2/LT as a function of the differential mode delay spread DMD (ps/m) for compensating links in which the operating wavelength has been shifted to 1310 nm (solid diamonds) or 1060 nm (open squares)

FIG. 7D is similar to FIG. 7C but illustrates the optimum value of the compensation ratio L2/LT as a function of the differential mode delay spread DMD (ps/m) for compensating links in which the operating wavelength has been shifted to 1310 nm (solid diamonds) or 1060 nm (open squares). In the examples of FIG. 7D, the operating wavelength $\lambda_O$ has been shifted from 850 nm to 1310 nm (solid diamonds) or 1060 nm (open squares).

In one embodiment in which legacy link 70 is converted from 850 nm to 1310 nm, the DMD spread between the lowest and highest order mode groups is approximately −3 ps/m, and the optimum compensation ratio for L2/LT is approximately 0.2. FIG. 7C indicates that this performance can be achieved when compensating fiber 60 has an alpha value of approximately $\alpha_{60}$=1.7 and primary fiber 40 has an alpha value of approximately $\alpha_{40}$=2.12.

Although the optimum ratio of the length L2 of compensating fiber 60 to the length L1 of primary fiber 40 results in the best system performance, it is desirable in practice to use a simplified design with one compensating fiber length for a range of primary fiber length to provide acceptable system performance. Tables 1 through 3 below set forth Examples (EX) 1 through 14 having combinations of the minimum length L1min and the maximum length L1max of primary fiber 40 and lengths L2 of compensating fiber 60 that yield error-free performance at 25 Gb/s for the designated values of L2 and ranges of L1. The Examples 1 through 6 in Table 1 are for legacy multimode fiber links 70 designed for operating at 850 nm and that are converted to an operating wavelength of 1310 nm using a compensating fiber 60 with alpha values $\alpha_{60}$ of either 1.58 or 1.5, as indicated.

TABLE 1

Examples 1 through 6

| EX | $\alpha_{60}$ | L1min (m) | L1max (m) | L2 (m) |
|---|---|---|---|---|
| 1 | 1.58 | 30 | 60 | 7.5 |
|  |  | 60 | 100 | 15 |
|  |  | 100 | 130 | 22.5 |
| 2 | 1.58 | 30 | 60 | 7 |
|  |  | 60 | 90 | 14 |
|  |  | 90 | 130 | 21 |
|  |  | 130 | 160 | 28 |
| 3 | 1.58 | 30 | 60 | 10 |
|  |  | 60 | 90 | 15 |
|  |  | 90 | 120 | 20 |
|  |  | 120 | 150 | 25 |
|  |  | 150 | 170 | 30 |

TABLE 1-continued

Examples 1 through 6

| EX | $\alpha_{60}$ | L1min (m) | L1max (m) | L2 (m) |
|---|---|---|---|---|
| 4 | 1.58 | 30 | 50 | 6 |
|   |      | 50 | 80 | 12 |
|   |      | 80 | 110 | 18 |
|   |      | 110 | 140 | 24 |
|   |      | 140 | 170 | 30 |
| 5 | 1.5 | 30 | 75 | 9 |
|   |     | 75 | 100 | 13.5 |
|   |     | 100 | 130 | 18 |
|   |     | 130 | 150 | 22.5 |
| 6 | 1.5 | 30 | 70 | 7.5 |
|   |     | 70 | 110 | 15 |

The Examples 7 through 10 in Table 2 are for legacy multimode fiber links 70 designed for operating at 850 nm and that are converted to an operating wavelength of 1310 nm using a compensating fiber 60 with alpha values $\alpha_{60}$ of 1.7.

TABLE 2

Examples 7 through 10

| EX | $\alpha_{60}$ | L1min (m) | L1max (m) | L2 (m) |
|---|---|---|---|---|
| 7 | 1.7 | 30 | 50 | 8 |
|   |     | 50 | 80 | 16 |
|   |     | 80 | 110 | 24 |
|   |     | 110 | 140 | 32 |
|   |     | 140 | 160 | 40 |
| 8 | 1.7 | 30 | 50 | 10 |
|   |     | 50 | 90 | 20 |
|   |     | 90 | 130 | 30 |
|   |     | 130 | 160 | 40 |
| 9 | 1.7 | 30 | 60 | 12 |
|   |     | 60 | 110 | 24 |
|   |     | 110 | 150 | 36 |
| 10 | 1.7 | 30 | 70 | 15 |
|    |     | 70 | 90 | 20 |
|    |     | 90 | 110 | 25 |
|    |     | 110 | 130 | 30 |
|    |     | 130 | 160 | 40 |
|    |     | 160 | 180 | 45 |
|    |     | 180 | 190 | 50 |

The Examples 11 through 14 in Table 3 are for legacy multimode fiber links 70 designed for operating at 850 nm and that are converted to an operating wavelength of 1060 nm using a compensating fiber 60 with alpha values $\alpha_{60}$ of either 1.58 or 1.7, as indicated.

TABLE 3

Examples 11 through 14

| EX | $\alpha_{60}$ | L1min (m) | L1max (m) | L2 (m) |
|---|---|---|---|---|
| 11 | 1.58 | 50 | 60 | 4 |
|    |      | 60 | 90 | 8 |
|    |      | 90 | 130 | 12 |
| 12 | 1.58 | 50 | 80 | 6 |
|    |      | 80 | 100 | 9 |
|    |      | 100 | 125 | 12 |
| 13 | 1.7 | 50 | 90 | 10 |
|    |     | 90 | 120 | 15 |
| 14 | 1.7 | 50 | 75 | 8 |
|    |     | 75 | 100 | 12 |
|    |     | 100 | 125 | 16 |

In the compensating fibers in Examples 1 through 14, $\Delta_{1MAX}$=0.99% and the core radius $r_1$ is 25 microns, which yields a numerical aperture of about 0.2 and a core diameter of about 50 microns. These NA and core sizes are the same as those found in the OM2-, OM3- and OM4-type multimode fibers installed in data centers, which ensures backward compatibility and low connector losses. The other design parameters in accordance with FIG. 4 are $(r_2-r_1)$=1.5 μm, $\Delta_2$=0.01%, $\Delta_3$=−0.39%, $\Delta_4$=0%, $(r_3-r_2)$=6.0 μm and $r_4$=62.5 μm.

FIG. 8 is a plot of the overfilled bandwidth at 1310 nm as a function of length L1 in accordance with Example 3 in Table 1. The system will achieve error-free performance at 25 Gb/s when the overfilled bandwidth is greater than the required bandwidth, which is the lower curve plotted with solid diamonds. A compensating fiber 60 with length L2=10 m is sufficient for lengths L1 between L1 min=30 m and L1max=60 m, and each addition 30 m requires an additional 5 m length of the compensating fiber. This scheme of adding integral numbers of compensating fibers with a constant length simplifies the cable management issues that would result if every link 70 in legacy system 10 had to be individually optimized.

Figure 9:
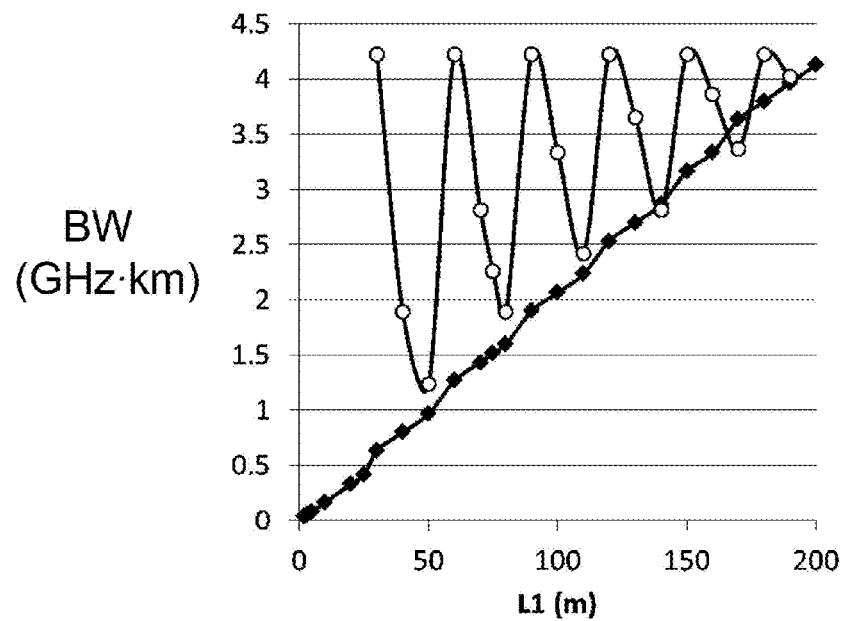
FIG. 9 is a plot of the overfilled bandwidth at 1310 nm of the link as a function of the length L1 of the primary fiber in accordance with Example 7.

FIG. 9 is similar to FIG. 8 and is a plot of the overfilled bandwidth at 1310 nm as a function of length L1 in accordance with Example 7 in Table 2. The system will achieve error-free performance at 25 Gb/s when the overfilled bandwidth is greater than the required bandwidth, which is the lower curve plotted with solid diamonds. A compensating fiber 60 with length L2=8 m is sufficient for lengths L1 between L1min=30 m and L1max=50 m, and additional 8-m lengths of the compensating fiber may be used to extend the reach of system 10 to a maximum of 160 m.

An actual example optical-fiber link 70 was formed having a ratio of 4:1 between the OM4 primary fiber 40 and compensating fiber 60. A DMD measurement of 40 m of compensating fiber 60 yielded a spread of −140 ps, which corresponds to a DMD spread of about −3 ps/m. FIG. 7D indicates that a compensation ratio of 0.2 should provide error-free performance at 25 Gb/s, and that was demonstrated in an experiment with optical-fiber links 70 with LT=125 m, where L1=100 m comprising OM4-type primary multimode fiber and L2=25 m comprising a compensating fiber with $\alpha_{60}$=1.7. A pseudorandom bit error sequence of $2^{31}$−1 yielded error-free performance for more than 10 minutes in system testing using a silicon-photonics transceiver operating at 1310 nm with a bit rate of 25 Gb/s.

Legacy Link Conversion

An aspect of the disclosure includes systems and methods for converting 850 nm legacy links 70 to 1310 links by accessing an existing primary fiber 40 and adding one or more sections of compensating fiber 60 to the existing primary fiber (i.e., a legacy jumper cable).

Figure 11:
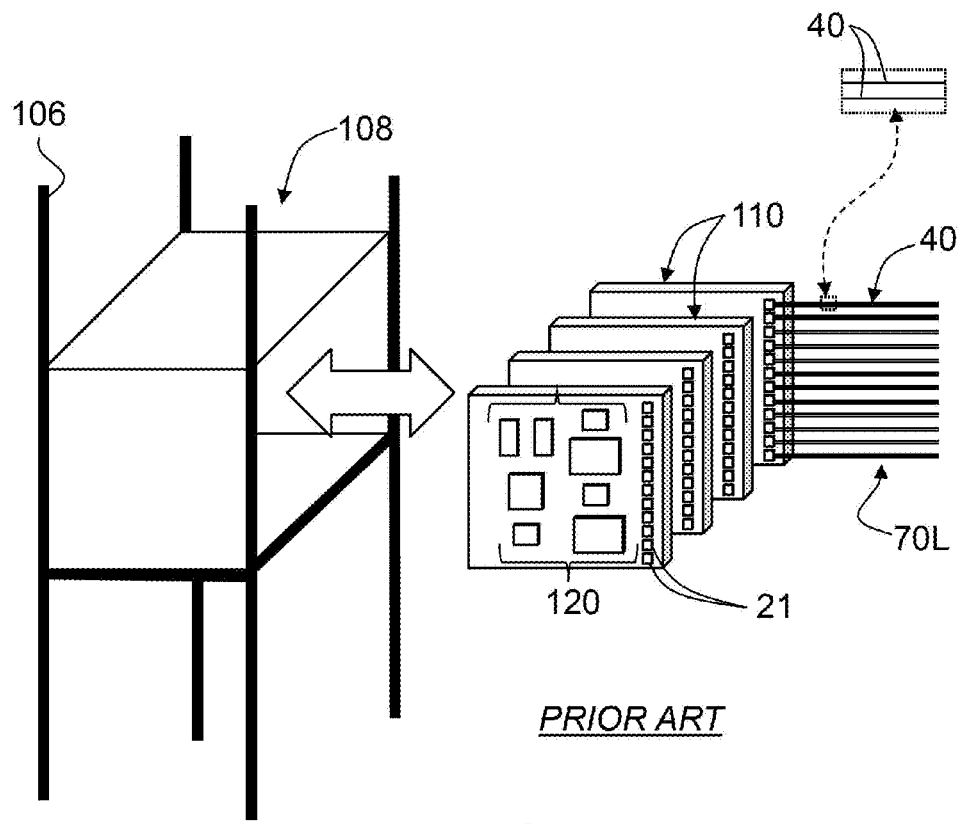
FIG. 11 is an elevated view of a rack that shows an example drawer that is used to house a number of blades that support multiple 850 nm transceivers as part of a prior-art, 850 nm optical-fiber system in a data center.

FIG. 10 shows an example prior-art data center 100 and includes a close-up view of two racks 106 within the data center that are optically connected by an 850 nm legacy link 70L. The racks 106 are used to store a number of drawers 108, such as shown in FIG. 11. The drawers 108 are used to store a number of transceiver cards or "blades" 110. Each blade 110 includes an array of transceivers 21, along with other electronic components 120. Each transceiver 21 is optically connected to an optical fiber cable 40. FIG. 11 shows two primary optical fibers 40 (see close-up inset) operably connected to each transceiver 21 by way of example. A typical data center 100 includes many (e.g., tens, hundreds or even thousands) of racks 106. The transceivers 21 in FIG. 11 are part of the legacy 850 nm optical-fiber system 10 and operate at 850 nm, and are thus referred to as "850 nm transceivers."

Figure 12:
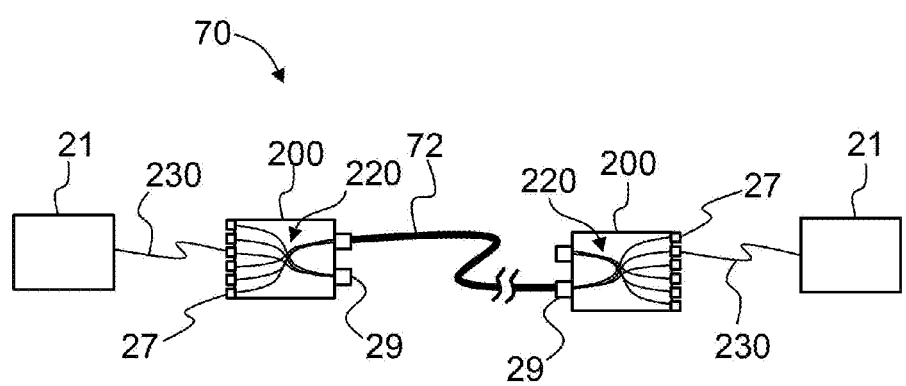
FIG. 12 is a schematic diagram of an example multimode optical-fiber system similar to FIG. 1B, but wherein the link includes breakout modules, fiber jumpers and a trunk cable optically connecting the breakout modules.

FIG. 12 is a schematic diagram of an example system 10 similar to FIG. 1B that shows in more detail the optical path between transceivers 21 as might exist in a legacy data center 100. Each of the transceivers 21 has an array of light sources 24 (see FIG. 14B) in the form of VCSEL lasers operating at 10 Gb/s and at a wavelength of about 850 nm, and a complementary array of photodetectors 84 (see FIG. 14B) capable of detecting signals at a wavelength of about 850 nm. There are typically ten VCSEL light sources 24 and ten photodetectors 84 in each transceiver 21.

The signal from the "transmit" end of the optical-link 70 may be transmitted via optical fiber jumpers 230 to other transceivers 21 in the same rack 106, to transceivers in nearby racks or into the front end of a breakout module 200, as shown, in which individual fibers (40, 60) are coupled into the fibers of a fiber array or "harness" 220. The breakout module 200 has front-end adapters 27 that allow for optical connection to one or more fibers (40, 60), e.g., two fibers arranged in a duplex adapter that connects to a duplex connector (not shown) at the end of jumper 230. A typical jumper 230 has a length in the range from 2 m to 30 m.

The breakout module 200 also has back-end multifiber adapters 29 that allow for connection to a trunk cable 72 or to a branch of a trunk cable, thereby forming an optical connection between the trunk cable and fiber array 220. The trunk cables 72 have lengths ranging from tens to hundreds of meters and connect racks 106 in different locations in data center 100. There is a breakout module 200 at the "receive" end of optical-fiber link 70, which is connected to a receive-end transceiver 21 using a second optical fiber jumper 230.

Data centers 100 with legacy links 70 would likely upgrade the existing links to have line rates of 25 Gb/s or higher, which would enable them to transmit 100 Gb/s of information in only four fibers rather than the ten fibers that are required with a line rate of 10 Gb/s. The 25 Gb/s VCSELs that operate at 850 nm have been developed and are expected to be commercially available in the near future. However, systems 10 that operate at a wavelength of 850 nm are constrained to a maximum length of about 100 m due to the high chromatic dispersion in the optical fibers (40, 60), and this means that only about 90% of links 70 in the system can be upgraded. Data centers 100 are therefore looking for a solution that enables them to upgrade links 70 to operate over lengths greater than 100 m at 25 Gb/s with minimum cost and complexity.

A method of forming system 10 with a link 70 that can operate at 25 Gb/s with a length of greater than 100 m is now explained using Example 4 in Table 1 as a guide to implementation. The links 70 that are shorter than 30 m can be upgraded by simply replacing the 10 Gb/s transceiver 21 with one that operates at 25 Gb/s. In an example, the operating wavelength of the upgraded transceiver 21 is 850 nm. Due to the relatively small modal bandwidth, the operating wavelength of the upgraded transceiver 21 may be between 840 nm and 1340 nm, for example, 980 nm, 1060 nm or 1310 nm.

For primary fibers 40 with lengths L1 in the range 30 m to 50 m, 6 m of compensating fiber 60 with an $\alpha_{60}=1.58$ is needed to convert link 70 from 850 nm to 1310 nm. This compensating fiber 60 may be coiled into one of the breakout modules 200 on either end of trunk cable 72, and we can refer to this module as a "DCM-30" since it compensates approximately 30 m of legacy OM4 primary fiber 40. The compensating fiber 60 may also be used to replace one of the optical fiber jumpers 230 between transceiver 21 and breakout module 200. For links 70 with a primary fiber 40 of length L1 between 50 m and 80 m, a compensating fiber 60 of length L2=12 m is added to the primary fiber. This compensating fiber 60 may be coiled entirely inside a single breakout module 200, which can be referred to as a "DCM-60," or deployed as a single 12-m optical fiber jumper 230. It may also be split into two DCM-30 breakout modules 200, split into two 6-m compensating optical fiber jumpers 230 that each employ compensating fiber 60 or split into one DCM-30 breakout module and one 6-m compensating optical fiber jumper 230.

Longer trunk cables 72 are upgraded in a similar manner. For example, links 70 with primary fibers 40 of length L1 between 80 m and 110 m require compensating fibers 60 of length L2=18 m and may utilize a DCM-60 and a DCM-30 breakout module 200, a DCM-60 breakout module 200 and a 6-m compensating optical fiber jumper 230, two DCM-30s and a 6-m compensating optical fiber jumper, a 12-m compensating optical fiber jumper and a 6-m compensating optical fiber jumper, or various other combinations in which the total length of compensating fiber 60 add up to 18 m.

In practice, it will likely be easier for data centers 100 to modify systems 10 by replacing existing breakout modules 200 with ones that include compensating fiber 60 rather by replacing all the individual optical fiber jumpers 230. In this respect, the preferred method for upgrading links 70 with primary fiber 40 of length L1 between 110 m and 140 m is to use DCM-60 breakout modules 200 at both ends of trunk cable 72. As illustrated by this example, data centers 100 have only to utilize two variations of breakout module 200 to upgrade systems 10 to 25 Gb/s, and this minimizes the cost and complexity compared to alternative solutions.

While this method enables links 70 with overall lengths LT as long as 190 m to be upgraded to 25 Gb/s by converting the operating wavelength to 1310 nm, links longer than about 140 m have more stringent bandwidth requirements and have tighter tolerances for the length of compensating fiber 60 and thus engineering the link bandwidth may require additional attention. In an example, it may be beneficial to replace links 70 with total lengths LT that are longer than 140 m with cables comprising multimode primary fiber 40 and compensating fibers 60 that are both optimized for high bandwidth in the 1310 nm window. One such product is ClearCurve® LX Multimode Fiber, which is manufactured by Corning, Inc., Corning, N.Y., and is specified to enable up to 300-m reach at 25 Gb/s over the 1,270 nm to 1,330 nm wavelength range.

Figure 13:
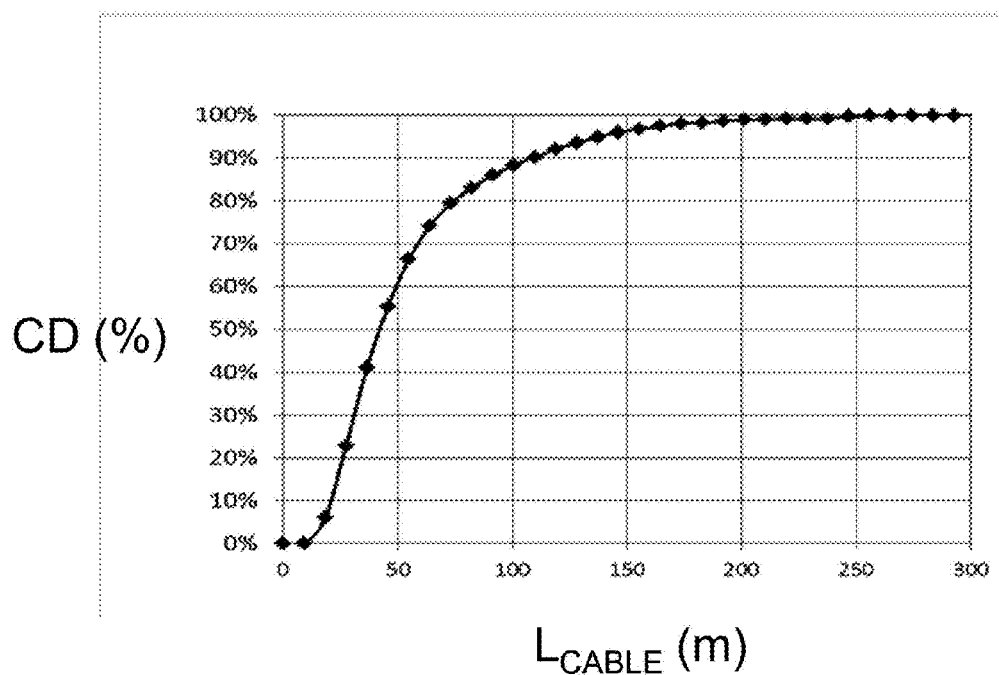
FIG. 13 is a plot of the length $L_{CABLE}$ (m) of a data-center cable (horizontal axis) versus the cumulative distribution CD (%) of the length $L_{CABLE}$ of the data-center cables based on historical data.

FIG. 13 is a plot of the length $L_{CABLE}$ (m) of a data-center cable (horizontal axis) versus the cumulative distribution CD (%) of the length $L_{CABLE}$ of the data center cables based on historical data collected by the IEEE. Thus, for example, for a cable length $L_{CABLE}=100$ m, the plot shows that just under 90% of all cables have a length of 100 m or less. For 50 m, the plot shows that 60% of all cables have a length of 50 m or less. The plot shows that about 98% of all data-center cables have a length of 200 m or less. In an example, the systems and methods disclosure herein provide modified links 70 suitable for use at 1310 nm and that have an overall length of 240 m or less.

Figure 14A:
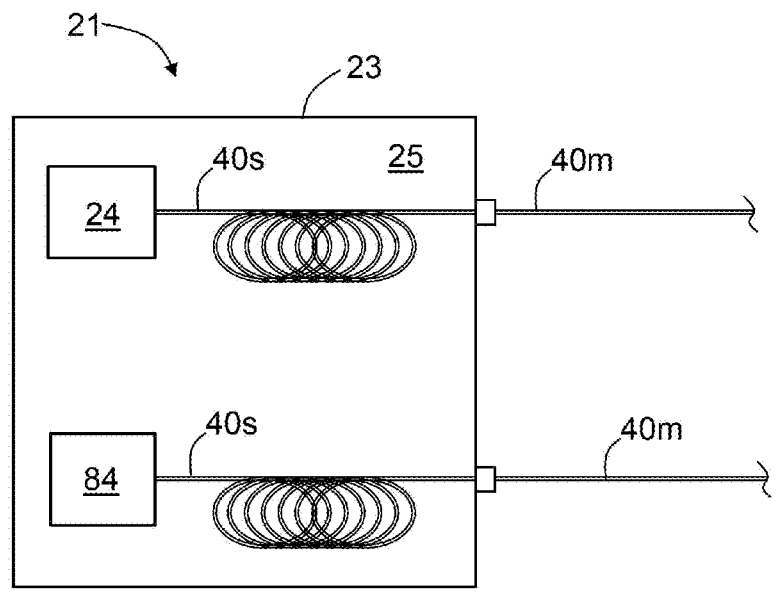
FIG. 14A is a close-up view of an example prior-art, 850 nm transceiver that includes a short section of primary optical fiber.
Figure 14B:
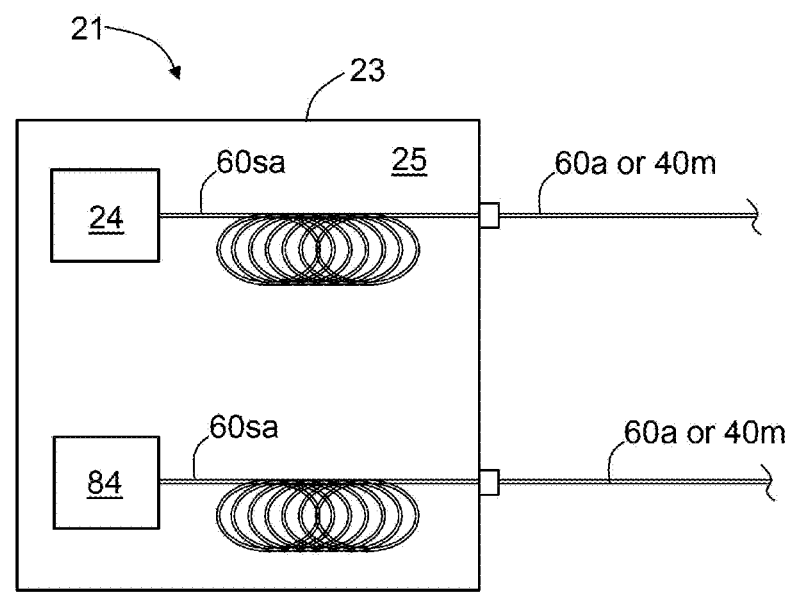
FIG. 14B is similar to FIG. 14A and shows an example 1310 nm transceiver that includes a short section of compensating optical fiber.

FIG. 14A is a close-up view of an example prior-art 850 nm transceiver 21 having a housing 23 that defines an interior 25. The transceiver 21 includes, within its interior 25, light source 24 and detector 84, each of which is connected to respective short lengths (e.g., 0.5 m to 2 m) 40s of primary fiber 40, which also resides within the housing interior. The internal short primary fibers 40s in turn connect respective external longer (main) primary fibers that constitute 850 nm legacy links 70 to another transceiver 21 of another blade 110, e.g., in a different rack 106, such as shown in FIG. 17. FIG. 14B is similar to FIG. 14A and shows an example embodiment of a modified 1310 nm transceiver 21 according to the disclosure and which is discussed in greater detail below.

Figure 15A:
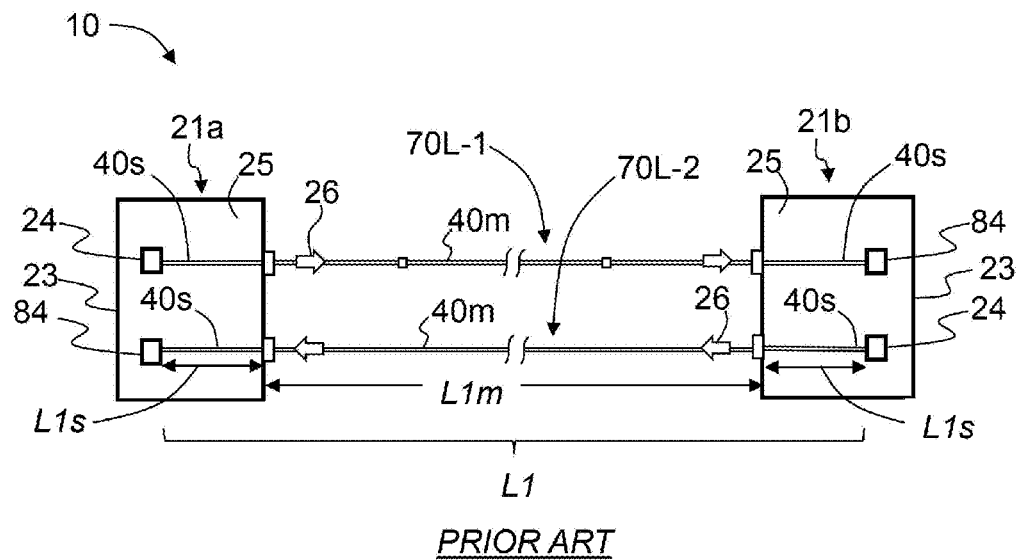
FIG. 15A is a schematic diagram of an example prior-art, 850 nm legacy optical-fiber system.

An aspect of the disclosure includes systems for and methods of converting the 850 nm legacy links 70L in data center 100 to 1310 nm links. FIG. 15A is a schematic diagram of an example prior-art legacy 850 nm optical-fiber system 10 that includes two 850 nm legacy links 70L-1 and 70L-2 that each include a main section 40m of primary fiber 40 of length L1m and two short sections 40s of the primary fiber each of length L1s in respective transceivers 21a and 21b. The overall length L1 of each 850 nm legacy link 70L is the length L1m of main section 40m plus the lengths L1s of each of the two short sections 40s of primary fiber 40. As noted above, the prior-art legacy optical-fiber system 10 is limited in its transmission length when operating at 850 nm over primary fiber 40 due mainly to adverse chromatic dispersion effects.

Figure 15B:
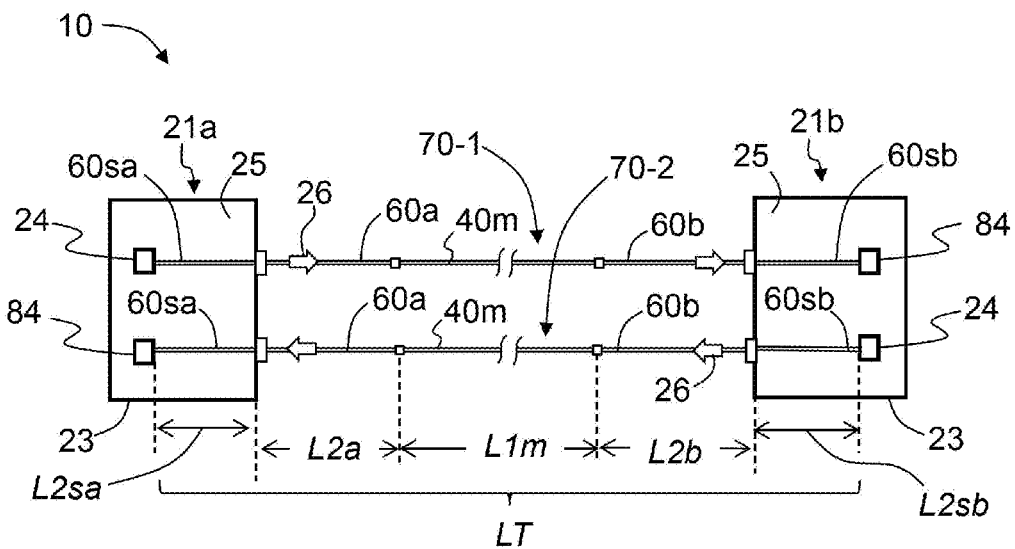
FIG. 15B is a schematic diagram of an example 1310 nm optical-fiber system formed from the legacy 850 nm optical-fiber system by adding sections of compensating optical fiber to the existing primary optical fiber.

FIG. 15B is similar to FIG. 15A and shows an example modified optical fiber system 10 for optical transmission at 1310 nm, i.e., a 1310 nm optical fiber system, according to the disclosure. The 1310 nm optical fiber system 10 includes two example links 70, hereinafter referred to as 1310 nm links and denoted 70-1 and 70-2. The two 1310 nm links 70-1 and 70-2 optically connect transceivers 21a and 21b of different blades 110, i.e., they connect light sources 24 and detectors 84 of the two transceivers 21a and 21b.

In an example, each link 70 includes a length L1m=L1 of primary fiber 40m attached at its respective ends to lengths L2a and L2b of compensating fiber 60. Each link 70 also includes short (e.g., 0.5 m to 2 m) sections 60sa and 60sb of compensating fiber 60 of respective lengths L2sa and L2sb within the respective interiors 25 of transceivers 21a and 21b, as shown in FIG. 15B. In an example, L2sa=L2sb. The short compensating fiber 60sa of transceiver 21a is optically connected to a section 60a of compensating fiber 60, and short compensating fiber 60sb of transceiver 21b is optically connected to a section 60b of the compensating fiber. For a compensating fiber 60 that is substantially bend-insensitive, the compensating fiber can be coiled in loops with bend diameters of 15 mm or less and with losses less than 0.2 dB.

Thus, the total length L2 of compensating fiber 60 in each 1310 nm link 70 is given by L2=L2sa+L2a+L2b+L2sb, while the total length of each link 70 is given by LT=L1+L2. It is noted that different segments of the two 1310 nm links 70-1 and 70-2 need not have the same lengths. In an example, the primary and secondary optical fibers 40 and 60 in 1310 nm links 70 are bend-insensitive, comprising graded index core 66 and trench 67, as shown in FIG. 2C.

The total length L2 of compensating fiber 60 in 1310 nm link 70 is selected for substantially optimum optical transmission at 1310 nm (i.e., the peak transmission wavelength is nominally 1310 nm). Thus, in 1310 nm optical fiber system 10, the 1310 nm transceivers 21 have light sources 24 (e.g., VCSELs) that emit light 26 of wavelength 1310 nm, while detectors 84 detect the 1310 nm light.

In an example, cable length $L_{CABLE}$ is defined as $L_{CABLE}$=L2a+L1+L2b. The cable length $L_{CABLE}$ represents the length of a compensating jumper cable made up of a section of primary fiber 40 (e.g., a legacy jumper) and one or more sections of compensating fiber 60 (e.g., compensating jumpers). In an example, compensating fiber(s) 60 is/are incorporated into one or more patchcords that optically connect to transceivers 21 in blades 110 or like components stored in rack 106.

Figure 16:
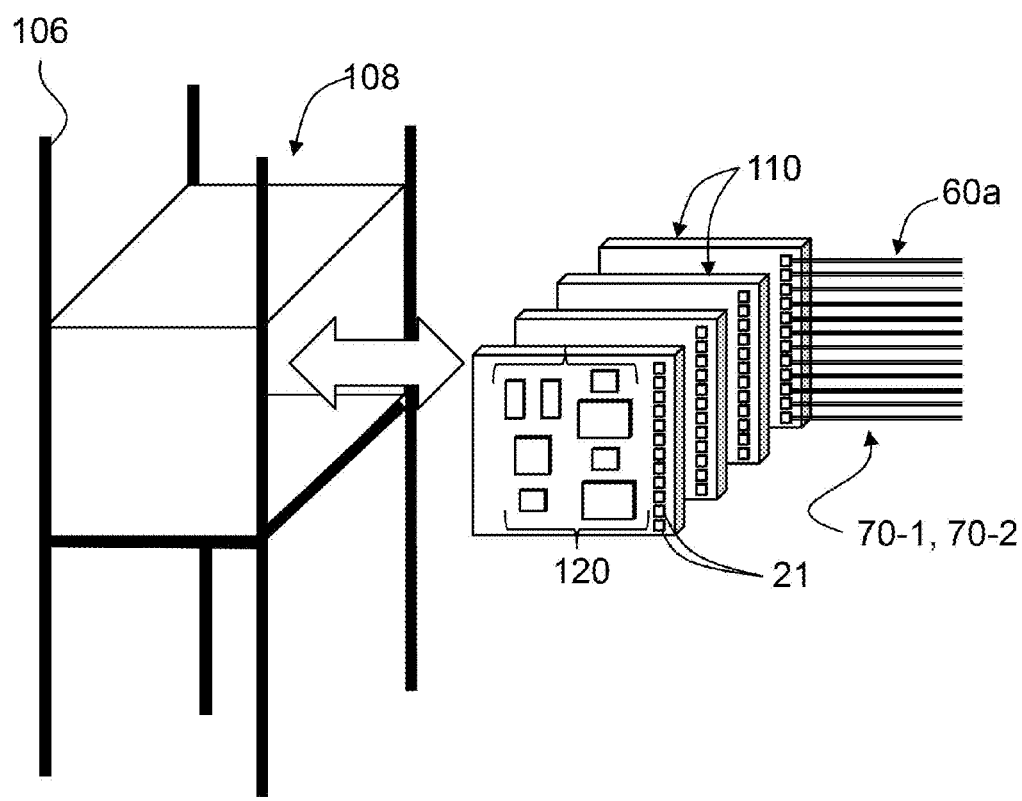
FIG. 16 is similar to FIG. 11 and shows an example blade that includes 1310 nm transceivers and compensating optical fibers optically coupled thereto.

FIG. 16 is similar to FIG. 11 and shows transceivers 21 on blade 110 being connected to sections 60a of compensating fiber 60 rather than primary fiber 40, wherein the transceivers each include short sections 60sa of compensating fiber as shown in FIGS. 14B and 15B, thereby forming 1310 nm links 70.

Figure 17A:
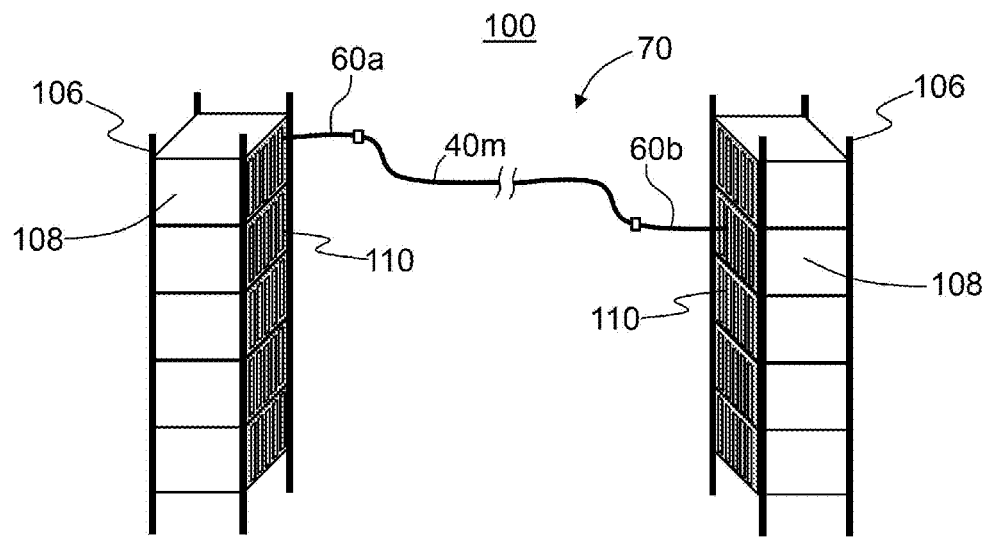
FIGS. 17A and 17B are similar to FIG. 10 and show example 1310 nm optical systems with different example 1310 nm links formed from the 850 nm legacy link.
Figure 17B:
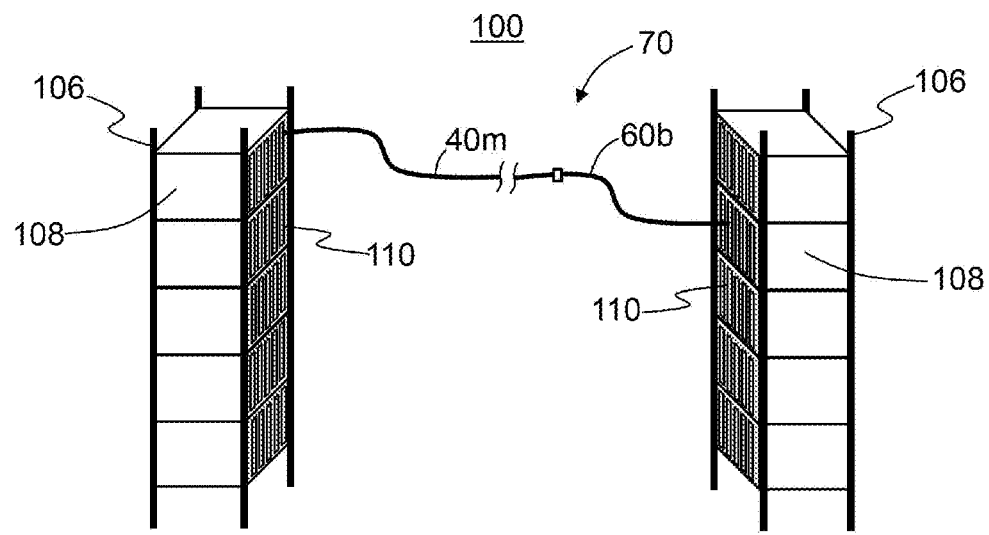

FIG. 17A is similar to FIG. 10 and shows two blades 110 in different racks 106 optically connected via an example 1310 nm link 70 that includes a central section 40m of primary fiber 40 connected at its respective ends to sections 60a and 60b of compensating fibers 60. FIG. 17B is similar to FIG. 17A and shows an example 1310 nm link 70 wherein section 60a of compensating fiber 60 is removed and the length of section 60b of the compensating fiber is made longer so that the total length L2 of the compensating fiber remains the same. In this embodiment, section 40m of primary fiber 40 is optically connected to short section 60sa of compensating fiber 60 in transceiver 21a (see FIG. 14B).

In one example, the effective modal bandwidth $EMBW_{40}$ of primary fiber 40 is greater than 2000 MHz·km at 850 nm and less than 1000 MHz·km at 1310 nm, but the effective modal bandwidth BW for 1310 nm link 70 is greater than 2000 MHz·km.

Forming Compensating Links with a Compensating Breakout Module

Figure 18:
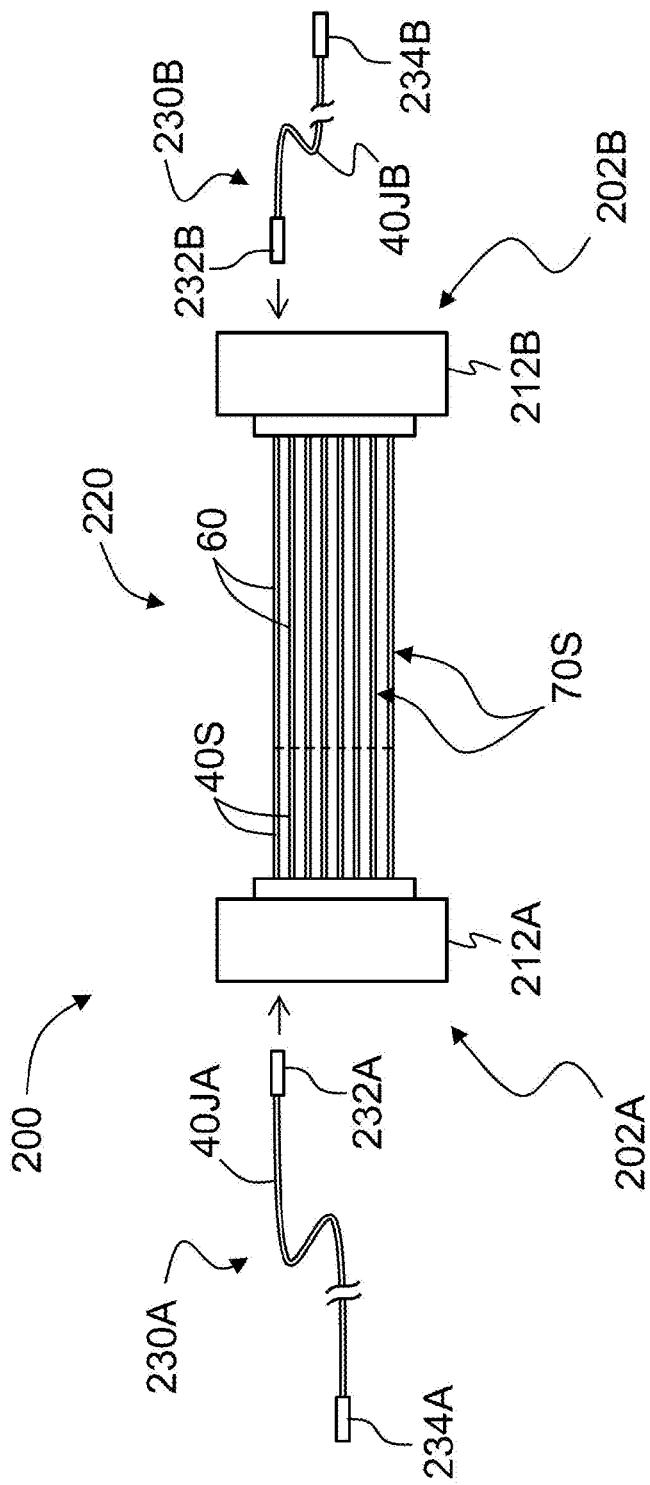
FIG. 18 is a schematic diagram of an example compensating link that includes a compensating breakout module.

FIG. 18 is a schematic diagram of an example compensating breakout module 200. The compensating breakout module 200 has opposite ends 202A and 202B that include respective multi-fiber connectors 212A and 212B (e.g., MTP or MPO connectors). The multi-fiber connectors 212A and 212B are optically connected by fiber array 220 that includes multiple link sections 70S, i.e., multiple primary fiber sections 40S of length LIS concatenated to respective multiple compensating fibers 60 of length L2. In an example, there are four, eight, twelve or twenty-four link sections 70S defined by fiber array 220, which in an example is in the form of a fiber ribbon. Jumper cables 230A and 230B with respective connectors 232A, 234A and 232B, 234B are shown in the act of being connected to respective multi-fiber connectors 212A and 212B. The compensating link 70 is thus defined by the two jumper cables 230A and 230B and the given link section 70S within breakout module 200.

In an example, compensating breakout module 200 includes the entire length L2 of compensating fiber 60 needed for compensating link 70, while primary fiber sections 40S include only a portion of the length of primary fiber 40 that makes up the rest of the compensating link. In this case, jumper cables 230A and 230B are respectively made up of sections 40JA of length L1JA and 40JB of length L1JB of primary fiber 40. Thus, the total length L1 of primary fiber 40 in link 70 is defined by L1=L1JA+L1S+L1JB.

In an example, a number of different compensating breakout modules 200 with different lengths L2 of compensating fiber 60 are available in data center 100 so that the appropriate compensating breakout module can be used to form compensating links 70 as needed. The respective connectors 234A and 234B can be used to connect to system components (e.g., blades 110) in data center 100.

For example, there are N2 sections of compensating optical fiber 60 selected from a collection of jumpers having NL2 different lengths, and wherein N2 is greater than or equal to 1 and less than or equal to 8 and NL2 is greater than or equal to 1 and less than or equal to 4. In another example, N2 is less than or equal to 4 and NL2 is less than or equal to 2.

The foregoing description provides exemplary embodiments to facilitate an understanding of the nature and character of the claims. It will be apparent to those skilled in the art that the various modifications to these embodiments can be made without departing from the spirit and scope of the appended claims.

What is claimed is:

1. A method of converting a first optical-fiber link with that operates at a wavelength $\lambda_1$ to a second optical-fiber link that operates at wavelength $\lambda_2$, comprising:
   accessing a primary optical fiber of the first optical-fiber link, the primary optical fiber having a length L1 and a nominal alpha value $\alpha_{40}$;

optically connecting at least one section of a compensating optical fiber of a length L2 and an alpha value of $\alpha_{60}$ to the primary multimode optical fiber to form the second optical-fiber link, and wherein the length L2 is in the range $(1/20)\cdot L1 \leq L2 \leq (1/3)\cdot L1$; and wherein L1 is greater than 30 m and less than 300 m and the second optical-fiber link provides an overfilled bandwidth of greater than 2 Ghz·km at $\lambda_2$ and a data rate of at least 25 Gb/s.

2. The method according to claim 1, wherein the at least one section of compensating optical fiber comprises a jumper.

3. The method according to claim 1, wherein there are N2 sections of compensating optical fiber selected from a collection of jumpers having NL2 different lengths, and wherein N2 is greater than or equal to 1 and less than or equal to 8 and NL2 is greater than or equal to 1 and less than or equal to 4.

4. The method according to claim 3, wherein N2 is less than or equal to 4 and NL2 is less than or equal to 2.

5. The method according to claim 1, wherein the at least one section of compensating optical fiber includes a short section of compensating optical fiber having a length of between 0.5 meters and 10 meters.

6. The method according to claim 1, wherein the at least one section of compensating optical fiber consists of a single section of compensating optical fiber.

7. The method according to claim 1, wherein the at least one section of compensating optical fiber constitutes part of a fiber array of a breakout module.

8. The method according to claim 1, further comprising optically connecting first and second transceivers with the second optical-fiber link, wherein the first and second transceivers are configured to transmit and detect light having a wavelength of 1310 nm.

9. The method according to claim 8, wherein the at least one section of compensating optical fiber resides within the first or second transceiver.

10. The method according to claim 1, wherein the at least one section of compensating fiber comprises a graded index core with a maximum relative refractive index $\Delta_{1MAX}$ in the range from 0.5% to 2.5%.

11. In a data center, a method of reconfiguring an optical-fiber system that has 850 nm transceivers optically coupled by a length L1 of primary optical fiber with a nominal alpha value of $\alpha_{40}$ of about 2.1, the method comprising:

replacing the 850 nm transceivers with 1310 nm transceivers;

adding at least one first section of compensating optical fiber to the primary optical fiber to form a 1310 nm optical-fiber link, wherein the at least one first section of compensating optical fiber define a total length L2 of compensating optical fiber and an alpha value $\alpha_{60}$ in the range $1.5 \leq \alpha_{60} \leq 1.8$, and wherein the length L2 is in the range $(1/20)\cdot L1 \leq L2 \leq (1/3)\cdot L1$; and optically connecting the one or more 1310 nm transceivers with the 1310 nm optical-fiber link, wherein the 1310 nm optical-fiber link supports an overfilled bandwidth of greater than 1.0 Ghz·km at 1310 nm.

12. The method according to claim 11, wherein the 1310 nm transceivers each include a short second section of compensating optical fiber having a length in the range from 0.5 meters to 5 meters.

13. The method according to claim 11, wherein the at least one first section of compensating optical fiber consists of a single section of compensating optical fiber.

14. The method according to claim 11, wherein the at least one first section of compensating optical fiber includes a jumper cable.

15. The method according to claim 11, wherein there are N2 first sections of compensating optical fiber selected from a collection of jumpers having NL2 different lengths and wherein N2 is greater than or equal to 1 and less than or equal to 8 and NL2 is greater than or equal to 1 and less than or equal to 4.

16. The method according to claim 15, wherein N2 is less than or equal to 4 and NL2 is less than or equal to 2.

17. The method according to claim 11, wherein the at least one first section of compensating optical fiber constitutes part of a fiber array of a breakout module.

18. A 1310 nm optical-fiber link for a data center, comprising:

first and second transceivers which are configured to transmit and detect light having a wavelength of 1310 nm;

a primary optical fiber having a length L1 optically connected to the first and second transceivers having a nominal alpha value $\alpha_{40}$ of about 2.1 and defining a legacy 850 nm optical-fiber link that supports an effective modal bandwidth of greater than 2 Ghz·km at 850 nm;

at least one section of compensating optical fiber of length L2 optically connected to the primary multimode optical fiber to define the 1310 nm optical-fiber link, the at least one section of compensating optical fiber having an alpha value $\alpha_{60}$ in the range $1.5 \leq \alpha_{60} \leq 1.8$;

wherein the length L2 is in the range $(1/20)\cdot L1 \leq L2 \leq (1/3)\cdot L1$; and wherein the 1310 nm optical-fiber link supports an overfilled bandwidth greater than 1 Ghz·km at 1310 nm.

19. The 1310 nm optical-fiber link according to claim 18, wherein the at least one section of compensating optical fiber includes a short section of compensating optical fiber having a length of between 0.5 meters and 5 meters.

20. The 1310 nm optical-fiber link according to claim 19, wherein the short section of compensating optical fiber resides within the housings of the first and second transceivers.

21. The method according to claim 18, wherein the at least one section of compensating optical fiber constitutes part of a fiber array of a breakout module.

22. The 1310 nm optical-fiber link according to claim 18, wherein the primary optical fiber supports an effective modal bandwidth of greater than 4.7 Ghz·km at 850 nm.

23. The optical-fiber link according to claim 18, wherein there are N2 sections of compensating optical fiber selected from a collection of jumpers having NL2 different lengths and wherein N2 is greater than or equal to 1 and less than or equal to 8 and NL2 is greater than or equal to 1 and less than or equal to 4.

24. The optical-fiber link according to claim 23, wherein N2 is less than or equal to 4 and NL2 is less than or equal to 2.

* * * * *